United States Patent
Guo et al.

(10) Patent No.: US 11,680,008 B2
(45) Date of Patent: *Jun. 20, 2023

(54) ALUMINOSILICATE GLASSES WITH HIGH FRACTURE TOUGHNESS

(71) Applicant: CORNING INCORPORATED, Corning, NY (US)

(72) Inventors: Xiaoju Guo, Pittsford, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/100,172

(22) Filed: Nov. 20, 2020

(65) Prior Publication Data

US 2021/0155528 A1    May 27, 2021

Related U.S. Application Data

(60) Provisional application No. 62/940,307, filed on Nov. 26, 2019.

(51) Int. Cl.
*C03C 3/091* (2006.01)
*C03C 3/064* (2006.01)
(Continued)

(52) U.S. Cl.
CPC ............. *C03C 3/091* (2013.01); *C03C 3/064* (2013.01); *C03C 4/18* (2013.01); *C03C 21/002* (2013.01); *C03C 2204/00* (2013.01)

(58) Field of Classification Search
CPC ......... C03C 3/091; C03C 3/097; C03C 3/076; C03C 3/083; C03C 3/089
See application file for complete search history.

(56) References Cited

U.S. PATENT DOCUMENTS 8,854,623 B2    10/2014  Fontaine et al.
11,136,258 B2 *  10/2021  Dejneka ................ C03C 3/093
(Continued)

FOREIGN PATENT DOCUMENTS

JP    2002-047030 A    2/2002
WO   2018/152845 A1   8/2018
(Continued)

OTHER PUBLICATIONS

Bubsey et al., "Closed-Form Expressions for Crack-Mouth Displacement and Stress Intensity Factors for Chevron-Notched Short Bar and Short Rod Specimens Based on Experimental Compliance Measurements", NASA Technical Memorandum, 83796, Oct. 1992, pp. 1-30.
(Continued)

Primary Examiner — Elizabeth E Mulvaney

(57) ABSTRACT

A glass composition includes: $Si_2O$, greater than 15 mol % to less than or equal to 32 mol % $Al_2O_3$, $B_2O_3$, $K_2O$, MgO, $Na_2O$, and $Li_2O$. The glass composition may have a fracture toughness of greater than or equal 0.75 MPa√m and a Young's modulus of greater than or equal to 80 GPa to less than or equal to 120 GPa. The glass composition is chemically strengthenable. The glass composition may be used in a glass article or a consumer electronic product.

22 Claims, 2 Drawing Sheets

(51) Int. Cl.
    *C03C 4/18*     (2006.01)
    *C03C 21/00*     (2006.01)

(56) References Cited

U.S. PATENT DOCUMENTS

| | | |
|---|---|---|
| 2016/0102011 A1 | 4/2016 | Hu et al. |
| 2016/0102014 A1 | 4/2016 | Hu et al. |
| 2019/0300422 A1 | 10/2019 | Guo et al. |
| 2021/0155527 A1* | 5/2021 | Guo .................. C03C 21/002 |

FOREIGN PATENT DOCUMENTS

| | | |
|---|---|---|
| WO | 2019/004124 A1 | 1/2019 |
| WO | 2019/231967 A1 | 12/2019 |
| WO | 2020/056006 A1 | 3/2020 |

OTHER PUBLICATIONS

Reddy et al, "Fracture Toughness Measurement of Glass and Ceramic Materials Using Chevron-Notched Specimens", J. Am. Ceram. Soc., vol. 71, No. 6, 1988, pp. C-310-C-313.
Rosales-Sosa et al., "Crack-resistant Al2O3-SiO2 glasses", Scientific Reports, vol. 6, Article No. 23620, 2016, 7 pages.
International Search Report and Written Opinion of the International Searching Authority; PCT/US2020/061432; dated Mar. 19, 2021, 12 pages; European Patent Office.

\* cited by examiner

ALUMINOSILICATE GLASSES WITH HIGH FRACTURE TOUGHNESS

This application claims the benefit of priority of U.S. Provisional Application Ser. No. 62/940,307 filed on Nov. 26, 2019 the content of which is relied upon and incorporated herein by reference in its entirety.

BACKGROUND

Field

The present specification generally relates to glass compositions suitable for use as cover glass for electronic devices. More specifically, the present specification is directed to aluminosilicate glasses that may be formed into cover glass for electronic devices.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

There are two major failure modes of cover glass when the associated portable device is dropped on a hard surface. One of the modes is flexure failure, which is caused by bending of the glass when the device is subjected to dynamic load from impact with the hard surface. The other mode is sharp contact failure, which is caused by introduction of damage to the glass surface. Impact of the glass with rough hard surfaces, such as asphalt, granite, etc., can result in sharp indentations in the glass surface. These indentations become failure sites in the glass surface from which cracks may develop and propagate.

Glass can be made more resistant to flexure failure by the ion-exchange technique, which involves inducing compressive stress in the glass surface. However, the ion-exchanged glass will still be vulnerable to dynamic sharp contact, owing to the high stress concentration caused by local indentations in the glass from the sharp contact.

It has been a continuous effort for glass makers and handheld device manufacturers to improve the resistance of handheld devices to sharp contact failure. Solutions range from coatings on the cover glass to bezels that prevent the cover glass from impacting the hard surface directly when the device drops on the hard surface. However, due to the constraints of aesthetic and functional requirements, it is very difficult to completely prevent the cover glass from impacting the hard surface.

It is also desirable that portable devices be as thin as possible. Accordingly, in addition to strength, it is also desired that glasses to be used as cover glass in portable devices be made as thin as possible. Thus, in addition to increasing the strength of the cover glass, it is also desirable for the glass to have mechanical characteristics that allow it to be formed by processes that are capable of making thin glass articles, such as thin glass sheets.

Accordingly, a need exists for glasses that can be strengthened, such as by ion exchange, and that have the mechanical properties that allow them to be formed as thin glass articles.

SUMMARY

According to aspect (1), a glass is provided. The glass has a composition comprising: greater than or equal to 37.0 mol % to less than or equal to 57.5 mol % $SiO_2$; greater than or equal to 15.0 mol % to less than or equal to 31.2 mol % $Al_2O_3$; greater than or equal to 1.3 mol % to less than or equal to 25.9 mol % $B_2O_3$; greater than or equal to 0 mol % to less than or equal to 7.7 mol % CaO; greater than or equal to 0.35 mol % to less than or equal to 0.5 mol % $K_2O$; greater than or equal to 1.7 mol % to less than or equal to 21.0 mol % MgO; greater than or equal to 2.0 mol % to less than or equal to 9.0 mol % $Na_2O$; and greater than or equal to 4.0 mol % to less than or equal to 11.9 mol % $Li_2O$.

According to aspect (2), the glass of aspect (1) is provided, wherein the composition has a liquidus viscosity of less than 1000 Poise.

According to aspect (3), the glass of any of aspects (1) to the previous aspect is provided, wherein the composition has a fracture toughness of greater than or equal 0.75 MPa√m.

According to aspect (4), the glass of any of aspects (1) to the previous aspect is provided, wherein the composition has a fracture toughness of greater than or equal 0.78 MPa√m.

According to aspect (5), the glass of any of aspects (1) to the previous aspect is provided, wherein the composition has a Young's modulus of greater than or equal to 80 GPa to less than or equal to 120 GPa.

According to aspect (6), the glass of any of aspects (1) to the previous aspect is provided, wherein the composition has a hardness of greater than or equal to 6.2 GPa to less than or equal to 7.7 GPa.

According to aspect (7), a glass is provided. The glass has a composition comprising: $Si_2O$; greater than 15 mol % to less than or equal to 32 mol % $Al_2O_3$; $B_2O_3$; $K_2O$; MgO; $Na_2O$; and $Li_2O$. The glass has a fracture toughness of greater than or equal 0.75 MPa√m, and a Young's modulus of greater than or equal to 80 GPa to less than or equal to 120 GPa.

According to aspect (8), the glass of aspect (7) is provided, further comprising CaO.

According to aspect (9), the glass of any of aspects (7) to the previous aspect is provided, comprising greater than or equal to 37.0 mol % to less than or equal to 57.5 mol % $SiO_2$.

According to aspect (10), the glass of any of aspects (7) to the previous aspect is provided, comprising greater than or equal to 15 mol % to less than or equal to 30 mol % $Al_2O_3$.

According to aspect (11), the glass of any of aspects (7) to the previous aspect is provided, comprising greater than or equal to 1.3 mol % to less than or equal to 25.9 mol % $B_2O_3$.

According to aspect (12), the glass of any of aspects (7) to the previous aspect is provided, comprising greater than or equal to 0 mol % to less than or equal to 7.7 mol % CaO.

According to aspect (13), the glass of any of aspects (7) to the previous aspect is provided, comprising greater than or equal to 0.35 mol % to less than or equal to 0.5 mol % $K_2O$.

According to aspect (14), the glass of any of aspects (7) to the previous aspect is provided, comprising greater than or equal to 1.7 mol % to less than or equal to 21.0 mol % MgO.

According to aspect (15), the glass of any of aspects (7) to the previous aspect is provided, comprising greater than or equal to 2.0 mol % to less than or equal to 9.0 mol % $Na_2O$.

According to aspect (16), the glass of any of aspects (7) to the previous aspect is provided, comprising greater than or equal to 4.0 mol % to less than or equal to 11.9 mol % $Li_2O$.

According to aspect (17), the glass of any of aspects (7) to the previous aspect is provided, wherein the composition has a fracture toughness of greater than or equal 0.78 MPa√m.

According to aspect (18), the glass of any of aspects (7) to the previous aspect is provided, wherein the composition has a fracture toughness of greater than or equal 0.82 MPa√m.

According to aspect (19), the glass of any of aspects (7) to the previous aspect is provided, wherein the composition has a liquidus viscosity of less than 1000 Poise.

According to aspect (20), a glass-based article is provided. The glass-based article is formed by ion exchanging a glass-based substrate. The glass-based article comprises a compressive stress region extending from a surface of the glass-based article to a depth of compression. The glass-based substrate may comprises the glass according to any of the preceding aspects.

According to aspect (21), a glass-based article is provided. The glass-based article includes a compressive stress region extending from a surface of the glass-based article to a depth of compression. A composition at the center of the glass-based article comprises: greater than or equal to 37.0 mol % to less than or equal to 57.5 mol % $SiO_2$; greater than or equal to 15.0 mol % to less than or equal to 31.2 mol % $Al_2O_3$; greater than or equal to 1.3 mol % to less than or equal to 25.9 mol % $B_2O_3$; greater than or equal to 0 mol % to less than or equal to 7.7 mol % CaO; greater than or equal to 0.35 mol % to less than or equal to 0.5 mol % $K_2O$; greater than or equal to 1.7 mol % to less than or equal to 21.0 mol % MgO; greater than or equal to 2.0 mol % to less than or equal to 9.0 mol % $Na_2O$; and greater than or equal to 4.0 mol % to less than or equal to 11.9 mol % $Li_2O$.

According to aspect (22), the glass-based article of any of aspects (20) to the preceding aspect is provided, wherein the compressive stress region comprises a compressive stress of greater than or equal to 500 MPa.

According to aspect (23), the glass-based article of any of aspects (20) to the preceding aspect is provided, comprising a depth of spike $DOL_{sp}$ of greater than or equal to 5 μm.

According to aspect (24), a consumer electronic product is provided. The consumer electronic product comprises: a housing comprising a front surface, a back surface and side surfaces; electrical components at least partially within the housing, the electrical components comprising a controller, a memory, and a display, the display at or adjacent the front surface of the housing; and a cover disposed over the display. At least a portion of at least one of the housing or the cover comprises glass-based article of any of aspects (20) to the preceding aspect.

According to aspect (25), a method is provided. The method comprises: ion exchanging a glass-based substrate to form a glass-based article comprising a compressive stress region extending from a surface of the glass-based article to a depth of compression. The glass-based substrate includes: greater than or equal to 37.0 mol % to less than or equal to 57.5 mol % $SiO_2$; greater than or equal to 15.0 mol % to less than or equal to 31.2 mol % $Al_2O_3$; greater than or equal to 1.3 mol % to less than or equal to 25.9 mol % $B_2O_3$; greater than or equal to 0 mol % to less than or equal to 7.7 mol % CaO; greater than or equal to 0.35 mol % to less than or equal to 0.5 mol % $K_2O$; greater than or equal to 1.7 mol % to less than or equal to 21.0 mol % MgO; greater than or equal to 2.0 mol % to less than or equal to 9.0 mol % $Na_2O$; and greater than or equal to 4.0 mol % to less than or equal to 11.9 mol % $Li_2O$.

According to aspect (26), a method is provided. The method comprises: ion exchanging a glass-based substrate to form a glass-based article comprising a compressive stress region extending from a surface of the glass-based article to a depth of compression. The glass-based substrate has a fracture toughness of greater than or equal 0.75 MPa√m, a Young's modulus of greater than or equal to 80 GPa to less than or equal to 120 GPa, and comprises: $Si_2O$; greater than 15 mol % to less than or equal to 32 mol % $Al_2O_3$; $B_2O_3$; $K_2O$; MgO; $Na_2O$; and $Li_2O$.

According to aspect (27), the method of any of aspects (25) to the preceding aspect is provided, wherein the ion exchanging comprises exposing the glass-based substrate to a molten salt bath containing sodium and potassium.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
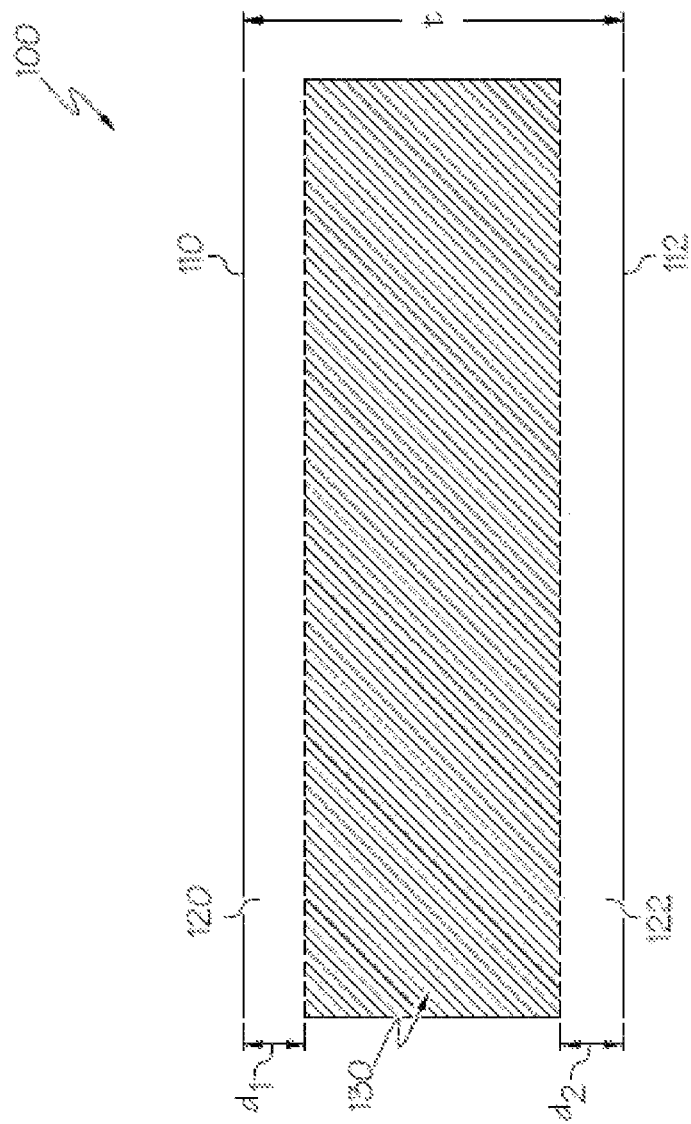
FIG. 1 schematically depicts a cross section of a glass having compressive stress layers on surfaces thereof according to embodiments disclosed and described herein.

Reference will now be made in detail to magnesium containing alkali aluminosilicate glasses according to various embodiments. Alkali aluminosilicate glasses have good ion exchangeability, and chemical strengthening processes have been used to achieve high strength and high toughness properties in alkali aluminosilicate glasses. Sodium aluminosilicate glasses are highly ion exchangeable glasses with high glass formability and quality. Lithium aluminosilicate glasses are highly ion exchangeable glasses with high glass quality. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved. The stress profiles achieved through chemical strengthening may have a variety of shapes that increase the drop performance, strength, toughness, and other attributes of the glass articles.

Therefore, alkali aluminosilicate glasses with good physical properties, chemical durability, and ion exchangeability have drawn attention for use as cover glass. In particular, lithium containing aluminosilicate glasses, which have higher fracture toughness and fast ion exchangeability, are provided herein. Through different ion exchange processes, greater central tension (CT), depth of compression (DOC), and high compressive stress (CS) can be achieved. However, the addition of lithium in the alkali aluminosilicate glass may reduce the melting point, softening point, or liquidus viscosity of the glass.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. Components of the alkali aluminosilicate glass composition according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits.

Disclosed herein are lithium aluminosilicate glass compositions that exhibit a high fracture toughness ($K_{IC}$). In some embodiments, the glass compositions are characterized by at least one of a $K_{IC}$ fracture toughness value of at least 0.75 MPa√m. Without wishing to be bound by any particular theory, it is believed that the high fracture toughness of the glasses described herein is due at least in part to the concentration of the high field strength components contained in the glass composition.

In embodiments of the alkali aluminosilicate glass compositions disclosed herein, $SiO_2$ is the largest constituent and, as such, $SiO_2$ is the primary constituent of the glass network formed from the glass composition. Pure $SiO_2$ has a relatively low CTE and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In embodiments, the glass composition generally comprises $SiO_2$ in an amount from greater than or equal to 37.0 mol % to less than or equal to 57.5 mol %, and all ranges and sub-ranges between the foregoing values. In some embodiments, the glass composition comprises $SiO_2$ in amounts greater than or equal to 38.0 mol %, such as greater than or equal to 39.0 mol %, greater than or equal to 40.0 mol %, greater than or equal to 41.0 mol %, greater than or equal to 42.0 mol %, greater than or equal to 43.0 mol %, greater than or equal to 44.0 mol %, greater than or equal to 45.0 mol %, greater than or equal to 46.0 mol %, greater than or equal to 47.0 mol %, greater than or equal to 48.0 mol %, greater than or equal to 49.0 mol %, greater than or equal to 50.0 mol %, greater than or equal to 51.0 mol %, greater than or equal to 52.0 mol %, greater than or equal to 53.0 mol %, greater than or equal to 54.0 mol %, greater than or equal to 55.0 mol %, greater than or equal to 56.0 mol %, or greater than or equal to 57.0 mol %. In some embodiments, the glass composition comprises $SiO_2$ in amounts less than or equal to 57.0 mol %, such as less than or equal to 56.0 mol %, less than or equal to 55.0 mol %, less than or equal to 54.0 mol %, less than or equal to 53.0 mol %, less than or equal to 52.0 mol %, less than or equal to 51.0 mol %, less than or equal to 50.0 mol %, less than or equal to 49.0 mol %, less than or equal to 48.0 mol %, less than or equal to 47.0 mol %, less than or equal to 46.0 mol %, less than or equal to 45.0 mol %, less than or equal to 44.0 mol %, less than or equal to 43.0 mol %, less than or equal to 42.0 mol %, less than or equal to 41.0 mol %, less than or equal to 40.0 mol %, less than or equal to 39.0 mol %, or less than or equal to 38.0 mol %. It should be understood that, in embodiments, any of the above ranges may be combined with any other range, such that the glass composition comprises $SiO_2$ in an amount from greater than or equal to 37.0 mol % to less than or equal to 57.0 mol %, from greater than or equal to 38.0 mol % to less than or equal to 56.0 mol %, from greater than or equal to 39.0 mol % to less than or equal to 55.0 mol %, from greater than or equal to 38.0 mol % to less than or equal to 54.0 mol %, from greater than or equal to 39.0 mol % to less than or equal to 53.0 mol %, from greater than or equal to 40.0 mol % to less than or equal to 52.0 mol %, from greater than or equal to 41.0 mol % to less than or equal to 51.0 mol %, from greater than or equal to 42.0 mol % to less than or equal to 50.0 mol %, from greater than or equal to 43.0 mol % to less than or equal to 49.0 mol %, from greater than or equal to 44.0 mol % to less than or equal to 48.0 mol %, from greater than or equal to 45.0 mol % to less than or equal to 47.0 mol %, and all ranges and sub-ranges between the foregoing values.

The glass composition of embodiments include $Al_2O_3$. $Al_2O_3$ may serve as a glass network former, similar to $SiO_2$. $Al_2O_3$ may increase the viscosity of the glass composition due to its tetrahedral coordination in a glass melt formed from a glass composition, decreasing the formability of the glass composition when the amount of $Al_2O_3$ is too high. However, when the concentration of $Al_2O_3$ is balanced against the concentration of $SiO_2$ and the concentration of alkali oxides in the glass composition, $Al_2O_3$ can reduce the liquidus temperature of the glass melt, thereby enhancing the liquidus viscosity and improving the compatibility of the glass composition with certain forming processes. The inclusion of $Al_2O_3$ in the glass compositions enables the high fracture toughness values described herein. In embodiments, the glass composition generally comprises $Al_2O_3$ in a concentration of from greater than or equal to 15.0 mol % to less than or equal to 31.2 mol %, and all ranges and sub-ranges between the foregoing values. In some embodiments, the glass composition comprises $Al_2O_3$ in amounts greater than 15 mol %, such as greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, greater than or equal to 24.5 mol %, greater than or equal to 25.0 mol %, greater than or equal to 25.5 mol %, greater than or equal to 26.0 mol %, greater than or equal to 26.5 mol %, greater than or equal to 27.0 mol %, greater than or equal to 27.5 mol %, greater than or equal to 28.0 mol %, greater than or equal to 28.5 mol %, greater than or equal to 29.0 mol %, greater than or equal to 29.5 mol %, greater than or equal to 30.0 mol %, greater than or equal to 30.5 mol %, or greater than or equal to 31.0 mol %. In embodiments, the glass composition comprises $Al_2O_3$ in amounts less than or equal to 32 mol %, such as less than or equal to 31.5 mol %, less than or equal to 31.0 mol %, less than or equal to 30.5 mol %, less than or equal to 30.0 mol %, less than or equal to 29.5 mol %, less than or equal to 29.0 mol %, less than or equal to 28.5 mol %, less than or equal to 28.0 mol %, less than or equal to 27.5 mol %, less than or equal to 27.0 mol %, less than or equal to 26.5 mol %, less than or equal to 26.0 mol %, less than or equal to 25.5 mol %, less than or equal to 25.0 mol %, less than or equal to 24.5 mol %, less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, or less than or equal to 15.5 mol %. It should be understood that, in embodiments, any of the above ranges may be combined with any other range, such that the glass composition comprises $Al_2O_3$ in an amount from greater than 15 mol % to less than or equal to 32 mol %, such as from greater than or equal to 15.0 mol % to less than or equal to 31.5 mol %, from greater than or equal to 15.5 mol % to less than or equal to 31.0 mol %, from greater than or equal to 16.0 mol % to less than or equal to 30.5 mol %, from greater than or equal to 16.5 mol % to less than or equal to 30.0 mol %, from greater than or equal to 17.0 mol % to less than or equal to 29.5 mol %, from greater than or equal to 17.5 mol % to less than or equal to 29.0 mol %, from greater than or equal to 18.0 mol % to less than or equal to 28.5 mol %, from greater than or equal to 18.5 mol % to less than or equal to 28.0 mol %, from greater than or equal to 19.0 mol % to less than or equal to 27.5 mol %, from greater than or equal to 19.5 mol % to less than or equal to 27.0 mol %, from greater than or equal to 20.0 mol % to less than or equal to 26.5 mol %, from greater than or equal to 20.5 mol % to less than or equal to 26.0 mol %, from greater than or equal to 21.0 mol % to less than or equal to 25.5 mol %, from greater than or equal to 21.5 mol % to less than or equal to 25.0 mol %, from greater than or equal to 22.0 mol % to less than or equal to 24.5 mol %, from greater than or equal to 22.5 mol % to less than or equal to 24.0 mol %, from greater than or equal to 23.0 mol % to less than or equal to 23.5 mol %, and all ranges and sub-ranges between the foregoing values.

Like $SiO_2$ and $Al_2O_3$, $B_2O_3$ is added to the glass composition as a network former, thereby reducing the meltability and formability of the glass composition. Thus, $B_2O_3$ may be added in amounts that do not overly decrease these properties. The inclusion of $B_2O_3$ in the glass compositions enables the high fracture toughness values described herein. In embodiments, the glass composition may comprise $B_2O_3$ in amounts from greater than or equal to 1.3 mol % $B_2O_3$ to less than or equal to 25.9 mol % $B_2O_3$, and all ranges and sub-ranges between the foregoing values. In embodiments, the glass composition may comprise $B_2O_3$ in amounts greater than 0 mol %, such as greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, greater than or equal to 20.5 mol %, greater than or equal to 21.0 mol %, greater than or equal to 21.5 mol %, greater than or equal to 22.0 mol %, greater than or equal to 22.5 mol %, greater than or equal to 23.0 mol %, greater than or equal to 23.5 mol %, greater than or equal to 24.0 mol %, greater than or equal to 24.5 mol %, greater than or equal to 25.0 mol %, or greater than or equal to 25.5 mol %. In embodiments, the glass composition may comprise $B_2O_3$ in an amount less than or equal to 25.5 mol %, such as less than or equal to 25.0 mol %, less than or equal to 24.5 mol %, less than or equal to 24.0 mol %, less than or equal to 23.5 mol %, less than or equal to 23.0 mol %, less than or equal to 22.5 mol %, less than or equal to 22.0 mol %, less than or equal to 21.5 mol %, less than or equal to 21.0 mol %, less than or equal to 20.5 mol %, less than or equal to 20.0 mol %, less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 12.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, or less than or equal to 1.5 mol %. It should be understood that, in embodiments, any of the above ranges may be combined with any other range, such that the glass composition comprises $B_2O_3$ in amounts from greater than or equal to 1.5 mol % to less than or equal to 25.5 mol %, such as greater than or equal to 2.0 mol % to less than or equal to 25.0 mol %, greater than or equal to 2.5 mol % to less than or equal to 24.5 mol %, greater than or equal to 3.0 mol % to less than or equal to 24.0 mol %, greater than or equal to 3.5 mol % to less than or equal to 23.5 mol %, greater than or equal to 4.0 mol % to less than or equal to 23.0 mol %, greater than or equal to 4.5 mol % to less than or equal to 22.5 mol %, greater than or equal to 5.0 mol % to less than or equal to 22.0 mol %, greater than or equal to 5.5 mol % to less than or equal to 21.5 mol %, greater than or equal to 6.0 mol % to less than or equal to 21.0 mol %, greater than or equal to 6.5 mol % to less than or equal to 20.5 mol %, greater than or equal to 7.0 mol % to less than or equal to 20.0 mol %, greater than or equal to 7.5 mol % to less than or equal to 19.5 mol %, greater than or equal to 8.0 mol % to less than or equal to 19.0 mol %, greater than or equal to 8.5 mol % to less than or equal to 18.5 mol %, greater than or equal to 9.0 mol % to less than or equal to 18.0 mol %, greater than or equal to 9.5 mol % to less than or equal to 17.5 mol %, greater than or equal to 10.0 mol % to less than or equal to 17.0 mol %, greater than or equal to 10.5 mol % to less than or equal to 16.5 mol %, greater than or equal to 11.0 mol % to less than or equal to 16.0 mol %, greater than or equal to 11.5 mol % to less than or equal to 15.5 mol %, greater than or equal to 12.0 mol % to less than or equal to 15.0 mol %, greater than or equal to 12.5 mol % to less than or equal to 14.5 mol %, greater than or equal to 13.0 mol % to less than or equal to 14.0 mol %, and all ranges and sub-ranges between the foregoing values.

The inclusion of $Li_2O$ in the glass composition allows for better control of an ion exchange process and further reduces the softening point of the glass, thereby increasing the manufacturability of the glass. The presence of $Li_2O$ in the glass compositions also allows the formation of a stress profile with a parabolic shape. In embodiments, the glass composition generally comprises $Li_2O$ in an amount from greater than 4.0 mol % to less than or equal to 11.9 mol %, and all ranges and sub-ranges between the foregoing values. In some embodiments, the glass composition comprises $Li_2O$ in amounts greater than or equal to 4.5 mol %, such as greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, or greater than or equal to 11.5 mol %. In some embodiments, the glass composition comprises $Li_2O$ in amounts less than or equal to 11.5 mol %, such as less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, or less than or equal to 4.5 mol %. It should be understood that, in embodiments, any of the above ranges may be combined with any other range, such that the glass composition comprises $Li_2O$ in an amount from greater than or equal to 4.5 mol % to less than or equal to 11.5 mol %, such as from greater than or equal to 5.0 mol % to less than or equal to 11.0 mol %, from greater than or equal to 5.5 mol % to less than or equal to 10.5 mol %, from greater than or equal to 6.0 mol % to less than or equal to 10.0 mol %, from greater than or equal to 6.5 mol % to less than or equal to 9.5 mol %, from greater than or equal to 7.0 mol % to less than or equal to 9.0 mol %, from greater than or equal to 7.5 mol % to less than or equal to 8.5 mol %, and all ranges and sub-ranges between the foregoing values.

According to embodiments, the glass composition also includes $Na_2O$. $Na_2O$ aids in the ion exchangeability of the glass composition, and also improves the formability, and thereby manufacturability, of the glass composition. However, if too much $Na_2O$ is added to the glass composition, the coefficient of thermal expansion (CTE) may be too low, and the melting point may be too high. The inclusion of $Na_2O$ in the glass compositions also enables high compressive stress values to be achieved through ion exchange strengthening. In embodiments, the glass composition generally comprises $Na_2O$ in an amount from greater than or equal to 2.0 mol % $Na_2O$ to less than or equal to 9.0 mol % $Na_2O$, and all ranges and sub-ranges between the foregoing values. In some embodiments, the glass composition comprises $Na_2O$ in amounts greater than or equal to 2.5 mol %, such as greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, or greater than or equal to 8.5 mol %. In some embodiments, the glass composition comprises $Na_2O$ in amounts less than or equal to 8.5 mol %, such as less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, or less than or equal to 4.5 mol %, less than or equal to 4.0 mol %, less than or equal to 3.5 mol %, less than or equal to 3.0 mol %, or less than or equal to 2.5 mol %. It should be understood that, in embodiments, any of the above ranges may be combined with any other range, such that the glass composition comprises $Na_2O$ in an amount from greater than or equal to 2.5 mol % to less than or equal to 8.5 mol %, such as from greater than or equal to 3.0 mol % to less than or equal to 8.0 mol %, from greater than or equal to 3.5 mol % to less than or equal to 7.5 mol %, from greater than or equal to 4.0 mol % to less than or equal to 7.0 mol %, from greater than or equal to 4.5 mol % to less than or equal to 6.5 mol %, from greater than or equal to 5.0 mol % to less than or equal to 6.0 mol %, and all ranges and sub-ranges between the foregoing values.

Like $Na_2O$, $K_2O$ also promotes ion exchange and increases the depth of compression (DOC) of a compressive stress layer formed as a result. However, adding $K_2O$ may cause the CTE to be too low, and the melting point to be too high. The glass composition includes $K_2O$. The inclusion of $K_2O$ in the glass composition enables a deep depth of a high compressive stress spike in the glass articles produced by ion exchange. In embodiments, $K_2O$ may be present in the glass composition in amounts greater than or equal to 0.35 mol % to less than or equal to 0.5 mol %, such as greater than or equal to 0.4 mol % to less than or equal to 0.45 mol %, greater than or equal to 0.40 mol % to less than or equal to 0.50 mol %, and all ranges and sub-ranges between the foregoing values. In embodiments, the glass composition may contain $K_2O$ in an amount of less than or equal to 2.0 mol %, such as less than or equal to 1.9 mol %, less than or equal to 1.8 mol %, less than or equal to 1.7 mol %, less than or equal to 1.6 mol %, less than or equal to 1.5 mol %, less than or equal to 1.4 mol %, less than or equal to 1.3 mol %, less than or equal to 1.2 mol %, less than or equal to 1.1 mol %, less than or equal to 1.0 mol %, less than or equal to 0.9 mol %, less than or equal to 0.8 mol %, less than or equal to 0.7 mol %, less than or equal to 0.6 mol %, less than or equal to 0.5 mol %, or less than or equal to 0.4 mol %. In embodiments, the glass composition may contain $K_2O$ in an amount of greater than 0 mol %, such as greater than or equal to 0.1 mol %, greater than or equal to 0.2 mol %, greater than or equal to 0.3 mol %, or greater than or equal to 0.4 mol %.

The glasses include magnesium. The inclusion of MgO lowers the viscosity of the glass, which may enhance the formability and manufacturability of the glass. The inclusion of MgO in the glass composition also improves the strain point and the Young's modulus of the glass composition, and may also improve the ion exchange ability of the glass. However, when too much MgO is added to the glass composition, the density and the CTE of the glass composition increase undesirably. The MgO included in the glass compositions enables, at least in part, the high fracture toughness values described herein. In embodiments, the glass composition comprises MgO in a concentration of from greater than or equal to 1.7 mol % to less than or equal to 21.0 mol %, and all ranges and sub-ranges between the foregoing values. In some embodiments, the glass composition comprises MgO in amounts greater than or equal to 2.0 mol %, such as greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, greater than or equal to 19.5 mol %, greater than or equal to 20.0 mol %, or greater than or equal to 20.5 mol %. In some embodiments, the glass composition comprises MgO in amounts less than or equal to 21 mol %, such as less than or equal to 20.5 mol %, less than or equal to 20.0 mol %, than or equal to 19.5 mol %, less than or equal to 19.0 mol %, than or equal to 18.5 mol %, less than or equal to 18.0 mol %, than or equal to 17.5 mol %, less than or equal to 17.0 mol %, less than or equal to 16.5 mol %, less than or equal to 16.0 mol %, less than or equal to 15.5 mol %, less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, or less than or equal to 2.0 mol %. It should be understood that, in embodiments, any of the above ranges may be combined with any other range, such that the glass composition comprises MgO in an amount from greater than or equal to 2.0 mol % to less than or equal to 20.5 mol %, such as from greater than or equal to 2.5 mol % to less than or equal to 20.0 mol %, from greater than or equal to 3.0 mol % to less than or equal to 19.5 mol %, from greater than or equal to 3.5 mol % to less than or equal to 19.0 mol %, from greater than or equal to 4.0 mol % to less than or equal to 18.5 mol %, from greater than or equal to 4.5 mol % to less than or equal to 18.0 mol %, from greater than or equal to 5.0 mol % to less than or equal to 17.5 mol %, from greater than or equal to 5.5 mol % to less than or equal to 17.0 mol %, from greater than or equal to 6.0 mol % to less than or equal to 16.5 mol %, from greater than or equal to 6.5 mol % to less than or equal to 16.0 mol %, from greater than or equal to 7.0 mol % to less than or equal to 15.5 mol %, from greater than or equal to 7.5 mol % to less than or equal to 15.0 mol %, from greater than or equal to 8.0 mol % to less than or equal to 15.5 mol %, from greater than or equal to 8.5 mol % to less than or equal to 15.0 mol %, from greater than or equal to 9.0 mol % to less than or equal to 14.5 mol %, from greater than or equal to 9.5 mol % to less than or equal to 14.0 mol %, from greater than or equal to 10.0 mol % to less than or equal to 13.5 mol %, from greater than or equal to 10.5 mol % to less than or equal to 13.0 mol %, from greater than or equal to 11.0 mol % to less than or equal to 12.5 mol %, from greater than or equal to 11.5 mol % to less than or equal to 12.0 mol %, and all ranges and sub-ranges between the foregoing values.

The glass compositions may include CaO. The inclusion of CaO lowers the viscosity of the glass, which enhances the formability, the strain point and the Young's modulus, and may improve the ion exchange ability. However, when too much CaO is added to the glass composition, the density and the CTE of the glass composition increase. In embodiments, the glass composition generally comprises CaO in a concentration of from greater than or equal to 0 mol % to less than or equal to 15.80 mol %, and all ranges and sub-ranges between the foregoing values. In embodiments, the glass composition comprises CaO in amounts greater than or equal to 0.1 mol %, such as greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, greater than or equal to 7.5 mol %, greater than or equal to 8.0 mol %, greater than or equal to 8.5 mol %, greater than or equal to 9.0 mol %, greater than or equal to 9.5 mol %, greater than or equal to 10.0 mol %, greater than or equal to 10.5 mol %, greater than or equal to 11.0 mol %, greater than or equal to 11.5 mol %, greater than or equal to 12.0 mol %, greater than or equal to 12.5 mol %, greater than or equal to 13.0 mol %, greater than or equal to 13.5 mol %, greater than or equal to 14.0 mol %, greater than or equal to 14.5 mol %, greater than or equal to 15.0 mol %, or greater than or equal to 15.5 mol %. In embodiments, the glass composition comprises CaO in amounts less than or equal to 15.5 mol %, such as less than or equal to 15.0 mol %, less than or equal to 14.5 mol %, less than or equal to 14.0 mol %, less than or equal to 13.5 mol %, less than or equal to 13.0 mol %, less than or equal to 12.5 mol %, less than or equal to 12.0 mol %, less than or equal to 11.5 mol %, less than or equal to 11.0 mol %, less than or equal to 10.5 mol %, less than or equal to 10.0 mol %, less than or equal to 9.5 mol %, less than or equal to 9.0 mol %, less than or equal to 8.5 mol %, less than or equal to 8.0 mol %, less than or equal to 7.5 mol %, less than or equal to 7.0 mol %, less than or equal to 8.5 mol %, less than or equal to 8.0 mol %, less than or equal to 7.5 mol %, less than or equal to 7.0 mol %, less than or equal to 6.5 mol %, less than or equal to 6.0 mol %, less than or equal to 5.5 mol %, less than or equal to 5.0 mol %, less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range, such that the glass composition comprises CaO in an amount from greater than or equal to 0.1 mol % to less than or equal to 15.5 mol %, such as from greater than or equal to 0.5 mol % to less than or equal to 15.0 mol %, from greater than or equal to 1.0 mol % to less than or equal to 14.5 mol %, from greater than or equal to 1.5 mol % to less than or equal to 14.0 mol %, from greater than or equal to 2.0 mol % to less than or equal to 13.5 mol %, from greater than or equal to 2.5 mol % to less than or equal to 13.0 mol %, from greater than or equal to 3.0 mol % to less than or equal to 12.5 mol %, from greater than or equal to 3.5 mol % to less than or equal to 12.0 mol %, from greater than or equal to 4.0 mol % to less than or equal to 11.5 mol %, from greater than or equal to 4.5 mol % to less than or equal to 11.0 mol %, from greater than or equal to 5.0 mol % to less than or equal to 10.5 mol %, from greater than or equal to 5.5 mol % to less than or equal to 10.0 mol %, from greater than or equal to 6.0 mol % to less than or equal to 9.5 mol %, from greater than or equal to 6.5 mol % to less than or equal to 9.0 mol %, from greater than or equal to 7.0 mol % to less than or equal to 8.5 mol %, from greater than or equal to 7.5 mol % to less than or equal to 8.0 mol %, and all ranges and sub-ranges between the foregoing values. In embodiments, the glass composition may be substantially free or free of CaO.

In embodiments, the glass composition may be substantially free or free of $TiO_2$. As used herein, the term "substantially free" means that the component is not added as a component of the batch material even though the component may be present in the final glass in very small amounts as a contaminant, such as less than 0.01 mol %. The inclusion of $TiO_2$ in the glass composition may result in the glass being susceptible to devitrification and/or exhibiting an undesirable coloration.

In embodiments, the glass composition may be substantially free or free of $ZrO_2$. The inclusion of $ZrO_2$ in the glass composition may result in the formation of undesirable zirconia in the glass, due at least in part to the low solubility of $ZrO_2$ in the glass.

In embodiments, the glass composition may be substantially free or free of $P_2O_5$. The inclusion of $P_2O_5$ in the glass composition may undesirably reduce the meltability and formability of the glass composition, thereby impairing the manufacturability of the glass composition. It is not necessary to include $P_2O_5$ in the glass compositions described herein to achieve the desired ion exchange performance. For this reason, $P_2O_5$ may be excluded from the glass composition to avoid negatively impacting the manufacturability of the glass composition while maintaining the desired ion exchange performance.

In embodiments, the glass composition may optionally include one or more fining agents. In some embodiments, the fining agents may include, for example, $SnO_2$. In such embodiments, $SnO_2$ may be present in the glass composition in an amount less than or equal to 0.2 mol %, such as from greater than or equal to 0 mol % to less than or equal to 0.2 mol %, from greater than or equal to 0 mol % to less than or equal to 0.1 mol %, from greater than or equal to 0 mol % to less than or equal to 0.05 mol %, from greater than or equal to 0.1 mol % to less than or equal to 0.2 mol %, and all ranges and sub-ranges between the foregoing values. In some embodiments, the glass composition may be substantially free or free of $SnO_2$.

In embodiments, the glass composition may be substantially free of one or both of arsenic and antimony. In other embodiments, the glass composition may be free of one or both of arsenic and antimony.

In embodiments, the glass composition may be substantially free or free of $Fe_2O_3$. Iron is often present in raw materials utilized to form glass compositions, and as a result may be detectable in the glass compositions described herein even when not actively added to the glass batch.

In addition to the above individual components, glass compositions according to embodiments disclosed herein may be characterized by the concentration of high field strength components contained therein. These high field strength components contribute to the toughness of the glass and also increase the hardness of the glass. As utilized herein, the term "high field strength components" refers to the group including $Al_2O_3$, MgO, $Li_2O$, $ZrO_2$, $La_2O_3$, and $Y_2O_3$. If the concentration of high field strength components in the glass is too low, the toughness of the glass is undesirably decreased and the desired fracture toughness may not be achieved. Additionally, when the concentration of high field strength components in the glass is too high, the manufacturability of the glass may be undesirably decreased. In embodiments, the glass composition may comprise $Al_2O_3$+MgO+$Li_2O$+$ZrO_2$+$La_2O_3$+$Y_2O_3$ in a concentration of from greater than 22.0 mol % to less than 45.0 mol %, and all ranges and sub-ranges between the foregoing values. In some embodiments, the glass composition may comprise $Al_2O_3$+MgO+$Li_2O$+$ZrO_2$+$La_2O_3$+$Y_2O_3$ in a concentration greater than or equal to 22.5 mol %, such as greater than or equal to 23.0 mol %, greater than or equal to 24.0 mol %, greater than or equal to 25.0 mol %, greater than or equal to 26.0 mol %, greater than or equal to 27.0 mol %, greater than or equal to 28.0 mol %, greater than or equal to 29.0 mol %, greater than or equal to 30.0 mol %, greater than or equal to 31.0 mol %, greater than or equal to 32.0 mol %, greater than or equal to 33.0 mol %, greater than or equal to 34.0 mol %, greater than or equal to 35.0 mol %, greater than or equal to 36.0 mol %, greater than or equal to 37.0 mol %, greater than or equal to 38.0 mol %, greater than or equal to 39.0 mol %, greater than or equal to 40.0 mol %, greater than or equal to 41.0 mol %, greater than or equal to 42.0 mol %, greater than or equal to 43.0 mol %, or greater than or equal to 44.0 mol %. In some embodiments, the glass composition may comprise $Al_2O_3$+MgO+$Li_2O$+$ZrO_2$+$La_2O_3$+$Y_2O_3$ in a concentration less than or equal to 45.0 mol %, such as less than or equal to 44.0 mol %, less than or equal to 43.0 mol %, less than or equal to 42.0 mol %, less than or equal to 41.0 mol %, less than or equal to 40.0 mol %, less than or equal to 39.0 mol %, less than or equal to 38.0 mol %, less than or equal to 37.0 mol %, less than or equal to 36.0 mol %, less than or equal to 35.0 mol %, less than or equal to 34.0 mol %, less than or equal to 33.0 mol %, less than or equal to 32.0 mol %, less than or equal to 31.0 mol %, less than or equal to 30.0 mol %, less than or equal to 29.0 mol %, less than or equal to 28.0 mol %, less than or equal to 27.0 mol %, less than or equal to 26.0 mol %, less than or equal to 25.0 mol %, less than or equal to 24.0 mol %, less than or equal to 23.0 mol %, or less than or equal to 22.5 mol %. It should be understood that, in embodiments, any of the above ranges may be combined with any other range, such that the glass composition comprises $Al_2O_3$+MgO+$Li_2O$+$ZrO_2$+$La_2O_3$+$Y_2O_3$ in a concentration of from greater than or equal to 22.5 mol % to less than or equal to 44.5 mol %, such as from greater than or equal to 23.0 mol % to less than or equal to 44.0 mol %, from greater than or equal to 24.0 mol % to less than or equal to 43.0 mol %, from greater than or equal to 25.0 mol % to less than or equal to 42.0 mol %, from greater than or equal to 26.0 mol % to less than or equal to 41.0 mol %, from greater than or equal to 27.0 mol % to less than or equal to 40.0 mol %, from greater than or equal to 28.0 mol % to less than or equal to 39.0 mol %, from greater than or equal to 29.0 mol % to less than or equal to 38.0 mol %, from greater than or equal to 30.0 mol % to less than or equal to 37.0 mol %, from greater than or equal to 31.0 mol % to less than or equal to 36.0 mol %, from greater than or equal to 32.0 mol % to less than or equal to 35.0 mol %, from greater than or equal to 33.0 mol % to less than or equal to 34.0 mol %, and all ranges and sub-ranges between the foregoing values.

Physical properties of the alkali aluminosilicate glass compositions as disclosed above will now be discussed. These physical properties can be achieved by modifying the component amounts of the alkali aluminosilicate glass composition, as will be discussed in more detail with reference to the examples.

Glass compositions according to embodiments have a high fracture toughness. Without wishing to be bound by any particular theory, the high fracture toughness may impart improved drop performance to the glass compositions. As utilized herein, the fracture toughness refers to the $K_{IC}$ value, and is measured by the chevron notched short bar method. The chevron notched short bar (CNSB) method utilized to measure the $K_{IC}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992). Additionally, the $K_{IC}$ values are measured on non-strengthened glass samples, such as measuring the $K_{IC}$ value prior to ion exchanging a glass article. The $K_{IC}$ values discussed herein are reported in MPa√m, unless otherwise noted.

In embodiments, the glass compositions exhibit a $K_{IC}$ value of greater than or equal to 0.750 MPa√m, such as greater than or equal to 0.755 MPa√m, greater than or equal to 0.760 MPa√m, greater than or equal to 0.765 MPa√m, greater than or equal to 0.770 MPa√m, greater than or equal to 0.775 MPa√m, greater than or equal to 0.780 MPa√m, greater than or equal to 0.785 MPa√m, greater than or equal to 0.790 MPa√m, greater than or equal to 0.795 MPa√m, greater than or equal to 0.800 MPa√m, greater than or equal to 0.805 MPa√m, greater than or equal to 0.810 MPa√m, greater than or equal to 0.815 MPa√m, greater than or equal to 0.820 MPa√m, greater than or equal to 0.825 MPa√m, greater than or equal to 0.835 MPa√m, greater than or equal to 0.845 MPa√m, greater than or equal to 0.855 MPa√m, greater than or equal to 0.860 MPa√m, greater than or equal to 0.865 MPa√m, greater than or equal to 0.870 MPa√m, greater than or equal to 0.875 MPa√m, greater than or equal to 0.880 MPa√m, greater than or equal to 0.880 MPa√m, greater than or equal to 0.885 MPa√m, greater than or equal to 0.890 MPa√m, or greater than or equal to 0.895 MPa√m. In embodiments, the glass compositions exhibit a $K_{IC}$ value of from greater than or equal to 0.750 MPa√m to less than or equal to 1.00 MPa√m, such as from greater than or equal to 0.76 MPa√m to less than or equal to 0.99 MPa√m, from greater than or equal to 0.77 to less than or equal to 0.98 MPa√m, from greater than or equal to 0.78 MPa√m to less than or equal to 0.97 MPa√m, from greater than or equal to 0.79 MPa√m to less than or equal to 0.96 MPa√m, from greater than or equal to 0.80 MPa√m to less than or equal to 0.95 MPa√m, from greater than or equal to 0.81 MPa√m to less than or equal to 0.94 MPa√m, from greater than or equal to 0.82 MPa√m to less than or equal to 0.93 MPa√m, from greater than or equal to 0.83 MPa√m to less than or equal to 0.92 MPa√m, from greater than or equal to 0.84 MPa√m to less than or equal to 0.91 MPa√m, from greater than or equal to 0.85 MPa√m to less than or equal to 0.90 MPa√m, from greater than or equal to 0.86 MPa√m to less than or equal to 0.89 MPa√m, from greater than or equal to 0.87 MPa√m to less than or equal to 0.88 MPa√m, and all ranges and sub-ranges between the foregoing values. The high fracture toughness of the glass compositions described herein increases the resistance of the glasses to damage.

In embodiments, the liquidus viscosity of the glass compositions is less than or equal to 1000 P, such as less than or equal to 950 P, less than or equal to 900 P, less than or equal to 850 P, less than or equal to 800 P, less than or equal to 750 P, less than or equal to 700 P, less than or equal to 650 P, less than or equal to 600 P, less than or equal to 550 P, or less than or equal to 500 P. In other embodiments, the liquidus viscosity is greater than or equal to 500 P, such as greater than or equal to 550 P, greater than or equal to 600 P, greater than or equal to 650 P, greater than or equal to 700 P, greater than or equal to 750 P, greater than or equal to 800 P, greater than or equal to 850 P, greater than or equal to 900 P, or greater than or equal to 950 P. It should be understood that, in embodiments, any of the above ranges may be combined with any other range, such that the liquidus viscosity is from greater than or equal to 500 P to less than or equal to 1000 P, such as greater than or equal to 550 P to less than or equal to 950 kP, greater than or equal to 600 P to less than or equal to 900 kP, greater than or equal to 650 P to less than or equal to 850 kP, greater than or equal to 700 P to less than or equal to 800 kP, and all ranges and sub-ranges between the foregoing values. The liquidus viscosity is determined by the following method. First the liquidus temperature of the glass is measured in accordance with ASTM C829-81 (2015), titled "Standard Practice for Measurement of Liquidus Temperature of Glass by the Gradient Furnace Method". Next the viscosity of the glass at the liquidus temperature is measured in accordance with ASTM C965-96 (2012), titled "Standard Practice for Measuring Viscosity of Glass Above the Softening Point".

In embodiments, the Young's modulus (E) of the glass compositions may be from greater than or equal to 75 GPa to less than or equal to 125 GPa, such as from greater than or equal to 80 GPa to less than or equal to 120 GPa, from greater than or equal to 81 GPa to less than or equal to 118 GPa, from greater than or equal to 82 GPa to less than or equal to 117 GPa, from greater than or equal to 83 GPa to less than or equal to 116 GPa, from greater than or equal to 84 GPa to less than or equal to 115 GPa, from greater than or equal to 85 GPa to less than or equal to 114 GPa, from greater than or equal to 86 GPa to less than or equal to 113 GPa, from greater than or equal to 87 GPa to less than or equal to 112 GPa, from greater than or equal to 88 GPa to less than or equal to 111 GPa, from greater than or equal to 89 GPa to less than or equal to 110 GPa, from greater than or equal to 90 GPa to less than or equal to 109 GPa, from greater than or equal to 91 GPa to less than or equal to 108 GPa, from greater than or equal to 92 GPa to less than or equal to 107 GPa, from greater than or equal to 93 GPa to less than or equal to 106 GPa, from greater than or equal to 94 GPa to less than or equal to 105 GPa, from greater than or equal to 95 GPa to less than or equal to 104 GPa, from greater than or equal to 96 GPa to less than or equal to 103 GPa, from greater than or equal to 97 GPa to less than or equal to 102 GPa, from greater than or equal to 98 GPa to less than or equal to 101 GPa, or from greater than or equal to 99 GPa to less than or equal to 100 GPa, and all ranges and sub-ranges between the foregoing values. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In embodiments, the glass composition may have a shear modulus (G) of from greater than or equal to 30 GPa to less than or equal to 35 GPa, such as from greater than or equal to 31 GPa to less than or equal to 34 GPa, from greater than or equal to 32 GPa to less than or equal to 33 GPa, and all ranges and sub-ranges between the foregoing values. The shear modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In embodiments, the glass compositions may have a Poisson's ratio (v) of from greater than or equal to 0.2 to less than or equal to 0.26, such as from greater than or equal to 0.21 to less than or equal to 0.25, from greater than or equal to 0.22 to less than or equal to 0.24, greater than or equal to 0.23, and all ranges and sub-ranges between the foregoing values. The Poisson's ratio value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

In embodiments, the glass compositions may have a hardness of greater than or equal to 6.2 GPa, such as greater than or equal to 6.3 GPa, greater than or equal to 6.4 GPa, greater than or equal to 6.5 GPa, greater than or equal to 6.6 GPa, greater than or equal to 6.7 GPa, greater than or equal to 6.8 GPa, greater than or equal to 6.9 GPa, greater than or equal to 7.0 GPa, greater than or equal to 7.1 GPa, greater than or equal to 7.2 GPa, greater than or equal to 7.3 GPa, greater than or equal to 7.4 GPa, greater than or equal to 7.5 GPa, or greater than or equal to 7.6 GPa. In embodiments, the glass compositions have a hardness of from greater than or equal to 6.2 GPa to less than or equal to 7.7 GPa, such as from greater than or equal to 6.3 GPa to less than or equal to 7.6 GPa, from greater than or equal to 6.4 GPa to less than or equal to 7.5 GPa, from greater than or equal to 6.5 GPa to less than or equal to 7.4 GPa, from greater than or equal to 6.6 GPa to less than or equal to 7.3 GPa, from greater than or equal to 6.7 GPa to less than or equal to 7.2 GPa, from greater than or equal to 6.8 GPa to less than or equal to 7.1 GPa, from greater than or equal to 6.9 GPa to less than or equal to 7.0 GPa, and all ranges and sub-ranges between the foregoing values. The hardness was measured by nanoindentation with a Berkovich tip.

From the above compositions, glass articles according to embodiments may be formed by any suitable method. In embodiments, the glass compositions may be formed by rolling processes.

The glass composition and the articles produced therefrom may be characterized by the manner in which it may be formed. For instance, the glass composition may be characterized as float-formable (i.e., formed by a float process) or roll-formable (i.e., formed by a rolling process).

In one or more embodiments, the glass compositions described herein may form glass articles that exhibit an amorphous microstructure and may be substantially free of crystals or crystallites. In other words, the glass articles formed from the glass compositions described herein may exclude glass-ceramic materials.

As mentioned above, in embodiments, the glass compositions described herein can be strengthened, such as by ion exchange, making a glass article that is damage resistant for applications such as, but not limited to, display covers. With reference to FIG. 1, a glass article is depicted that has a first region under compressive stress (e.g., first and second compressive layers 120, 122 in FIG. 1) extending from the surface to a depth of compression (DOC) of the glass article and a second region (e.g., central region 130 in FIG. 1) under a tensile stress or central tension (CT) extending from the DOC into the central or interior region of the glass article. As used herein, DOC refers to the depth at which the stress within the glass article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS|. The compressive stress (CS) has a maximum at or near the surface of the glass article, and the CS varies with distance d from the surface according to a function. Referring again to FIG. 1, a first segment 120 extends from first surface 110 to a depth d1 and a second segment 122 extends from second surface 112 to a depth dz. Together, these segments define a compression or CS of glass article 100. Compressive stress (including surface CS) may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

In embodiments, the CS of the glass articles is from greater than or equal to 400 MPa to less than or equal to 1200 MPa, such as from greater than or equal to 425 MPa to less than or equal to 1150 MPa, from greater than or equal to 450 MPa to less than or equal to 1100 MPa, from greater than or equal to 475 MPa to less than or equal to 1050 MPa, from greater than or equal to 500 MPa to less than or equal to 1000 MPa, from greater than or equal to 525 MPa to less than or equal to 975 MPa, from greater than or equal to 550 MPa to less than or equal to 950 MPa, from greater than or equal to 575 MPa to less than or equal to 925 MPa, from greater than or equal to 600 MPa to less than or equal to 900 MPa, from greater than or equal to 625 MPa to less than or equal to 875 MPa, from greater than or equal to 650 MPa to less than or equal to 850 MPa, from greater than or equal to 675 MPa to less than or equal to 825 MPa, from greater than or equal to 700 MPa to less than or equal to 800 MPa, from greater than or equal to 725 MPa to less than or equal to 775 MPa, greater than or equal to 750 MPa, and all ranges and sub-ranges between the foregoing values.

In one or more embodiments, $Na^+$ and $K^+$ ions are exchanged into the glass article and the $Na^+$ ions diffuse to a deeper depth into the glass article than the $K^+$ ions. The depth of penetration of K⁺ ions ("Potassium DOL") is distinguished from DOC because it represents the depth of potassium penetration as a result of an ion exchange process. The Potassium DOL is typically less than the DOC for the articles described herein. Potassium DOL is measured using a surface stress meter such as the commercially available FSM-6000 surface stress meter, manufactured by Orihara Industrial Co., Ltd. (Japan), which relies on accurate measurement of the stress optical coefficient (SOC), as described above with reference to the CS measurement. The potassium DOL may define a depth of a compressive stress spike ($DOL_{SP}$), where a stress profile transitions from a steep spike region to a less-steep deep region. The deep region extends from the bottom of the spike to the depth of compression. The $DOL_{SP}$ of the glass articles may be from greater than or equal to 5 μm to less than or equal to 30 μm, such as from greater than or equal to 6 μm to less than or equal to 25 μm, from greater than or equal to 7 μm to less than or equal to 20 μm, from greater than or equal to 8 μm to less than or equal to 15 μm, or from greater than or equal to 9 μm to less than or equal to 11 μm, greater than or equal to 10 μm, and all ranges and sub-ranges between the foregoing values.

The compressive stress of both major surfaces (110, 112 in FIG. 1) is balanced by stored tension in the central region (130) of the glass article. The maximum central tension (CT) and DOC values may be measured using a scattered light polariscope (SCALP) technique known in the art. The refracted near-field (RNF) method or SCALP may be used to determine the stress profile of the glass articles. When the RNF method is utilized to measure the stress profile, the maximum CT value provided by SCALP is utilized in the RNF method. In particular, the stress profile determined by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

In embodiments, the glass articles may have a maximum CT greater than or equal to 20 MPa, such as greater than or equal to 25 MPa, greater than or equal to 30 MPa, greater than or equal to 35 MPa, greater than or equal to 40 MPa, greater than or equal to 45 MPa, greater than or equal to 50 MPa, greater than or equal to 55 MPa, greater than or equal to 60 MPa, greater than or equal to 65 MPa, greater than or equal to 70 MPa, greater than or equal to 75 MPa, greater than or equal to 80 MPa, greater than or equal to 85 MPa, greater than or equal to 90 MPa, greater than or equal to 95 MPa, greater than or equal to 100 MPa, or greater than or equal to 105 MPa, and all ranges and sub-ranges between the foregoing values. In some embodiments, the glass article may have a maximum CT less than or equal to 110 MPa, such as less than or equal to 105 MPa, less than or equal to 100 MPa, less than or equal to 95 MPa, less than or equal to 90 MPa, less than or equal to 85 MPa, less than or equal to 80 MPa, less than or equal to 75 MPa, less than or equal to 70 MPa, less than or equal to 65 MPa, less than or equal to 60 MPa, less than or equal to 55 MPa, less than or equal to 50 MPa, less than or equal to 45 MPa, less than or equal to 40 MPa, less than or equal to 35 MPa, less than or equal to 30 MPa, or less than or equal to 25 MPa, and all ranges and sub-ranges between the foregoing values. It should be understood that, in embodiments, any of the above ranges may be combined with any other range, such that the glass article may have a maximum CT from greater than or equal to 20 MPa to less than or equal to 110 MPa, such as from greater than or equal to 25 MPa to less than or equal to 105 MPa, from greater than or equal to 30 MPa to less than or equal to 100 MPa, from greater than or equal to 35 MPa to less than or equal to 95 MPa, from greater than or equal to 40 MPa to less than or equal to 90 MPa, from greater than or equal to 45 MPa to less than or equal to 85 MPa, from greater than or equal to 50 MPa to less than or equal to 80 MPa, from greater than or equal to 55 MPa to less than or equal to 75 MPa, from greater than or equal to 60 MPa to less than or equal to 70 MPa, and all ranges and sub-ranges between the foregoing values.

The high fracture toughness values of the glass compositions described herein also may enable improved performance. The frangibility limit of the glass articles produced utilizing the glass compositions described herein is dependent at least in part on the fracture toughness. For this reason, the high fracture toughness of the glass compositions described herein allows for a large amount of stored strain energy to be imparted to the glass articles formed therefrom without becoming frangible. The increased amount of stored strain energy that may then be included in the glass articles allows the glass articles to exhibit increased fracture resistance, which may be observed through the drop performance of the glass articles. The relationship between the frangibility limit and the fracture toughness is described in U.S. patent application Ser. No. 16/565,899, titled "Glass-based Articles with Improved Fracture Resistance," filed Sep. 10, 2019, the entirety of which is incorporated herein by reference. The relationship between the fracture toughness and drop performance is described in U.S. patent application Ser. No. 16/425,217, titled "Glass with Improved Drop Performance," filed May 29, 2019, the entirety of which is incorporated herein by reference.

As noted above, DOC is measured using a scattered light polariscope (SCALP) technique known in the art. The DOC is provided in some embodiments herein as a portion of the thickness (t) of the glass article. In embodiments, the glass articles may have a depth of compression (DOC) from greater than or equal to 0.15t to less than or equal to 0.25t, such as from greater than or equal to 0.18t to less than or equal to 0.22t, or from greater than or equal to 0.19t to less than or equal to 0.21t, and all ranges and sub-ranges between the foregoing values.

Compressive stress layers may be formed in the glass by exposing the glass to an ion exchange solution. In embodiments, the ion exchange solution may be molten nitrate salt. In some embodiments, the ion exchange solution may be molten $KNO_3$, molten $NaNO_3$, or combinations thereof. In certain embodiments, the ion exchange solution may comprise less than about 95% molten $KNO_3$, such as less than about 90% molten $KNO_3$, less than about 80% molten $KNO_3$, less than about 70% molten $KNO_3$, less than about 60% molten $KNO_3$, or less than about 50% molten $KNO_3$. In certain embodiments, the ion exchange solution may comprise at least about 5% molten $NaNO_3$, such as at least about 10% molten $NaNO_3$, at least about 20% molten $NaNO_3$, at least about 30% molten $NaNO_3$, or at least about 40% molten $NaNO_3$. In other embodiments, the ion exchange solution may comprise about 95% molten $KNO_3$ and about 5% molten $NaNO_3$, about 94% molten $KNO_3$ and about 6% molten $NaNO_3$, about 93% molten $KNO_3$ and about 7% molten $NaNO_3$, about 90% molten $KNO_3$ and about 10% molten $NaNO_3$, about 80% molten $KNO_3$ and about 20% molten $NaNO_3$, about 75% molten $KNO_3$ and about 25% molten $NaNO_3$, about 70% molten $KNO_3$ and about 30% molten $NaNO_3$, about 65% molten $KNO_3$ and about 35% molten $NaNO_3$, or about 60% molten $KNO_3$ and about 40% molten $NaNO_3$, and all ranges and sub-ranges between the foregoing values. In embodiments, other sodium and potassium salts may be used in the ion exchange solution, such as, for example sodium or potassium nitrites, phosphates, or sulfates. In embodiments, the ion exchange solution may include lithium salts, such as $LiNO_3$.

The glass composition may be exposed to the ion exchange solution by dipping a glass substrate made from the glass composition into a bath of the ion exchange solution, spraying the ion exchange solution onto a glass substrate made from the glass composition, or otherwise physically applying the ion exchange solution to a glass substrate made from the glass composition to form the ion exchanged glass article. Upon exposure to the glass composition, the ion exchange solution may, according to embodiments, be at a temperature from greater than or equal to 360° C. to less than or equal to 500° C., such as from greater than or equal to 370° C. to less than or equal to 490° C., from greater than or equal to 380° C. to less than or equal to 480° C., from greater than or equal to 390° C. to less than or equal to 470° C., from greater than or equal to 400° C. to less than or equal to 460° C., from greater than or equal to 410° C. to less than or equal to 450° C., from greater than or equal to 420° C. to less than or equal to 440° C., greater than or equal to 430° C., and all ranges and sub-ranges between the foregoing values. In embodiments, the glass composition may be exposed to the ion exchange solution for a duration from greater than or equal to 4 hours to less than or equal to 48 hours, such as from greater than or equal to 8 hours to less than or equal to 44 hours, from greater than or equal to 12 hours to less than or equal to 40 hours, from greater than or equal to 16 hours to less than or equal to 36 hours, from greater than or equal to 20 hours to less than or equal to 32 hours, or from greater than or equal to 24 hours to less than or equal to 28 hours, and all ranges and sub-ranges between the foregoing values.

The ion exchange process may be performed in an ion exchange solution under processing conditions that provide an improved compressive stress profile as disclosed, for example, in U.S. Patent Application Publication No. 2016/0102011, which is incorporated herein by reference in its entirety. In some embodiments, the ion exchange process may be selected to form a parabolic stress profile in the glass articles, such as those stress profiles described in U.S. Patent Application Publication No. 2016/0102014, which is incorporated herein by reference in its entirety.

After an ion exchange process is performed, it should be understood that a composition at the surface of an ion exchanged glass article is be different than the composition of the as-formed glass substrate (i.e., the glass substrate before it undergoes an ion exchange process). This results from one type of alkali metal ion in the as-formed glass substrate, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed non-ion exchanged glass substrate utilized to form the glass article.

Figure 2A:
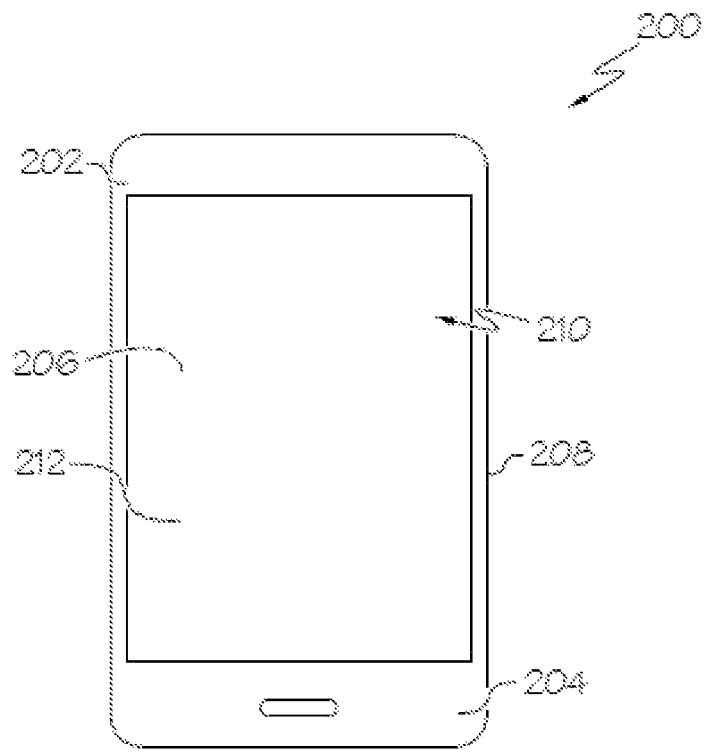
FIG. 2A is a plan view of an exemplary electronic device incorporating any of the glass articles disclosed herein.
Figure 2B:
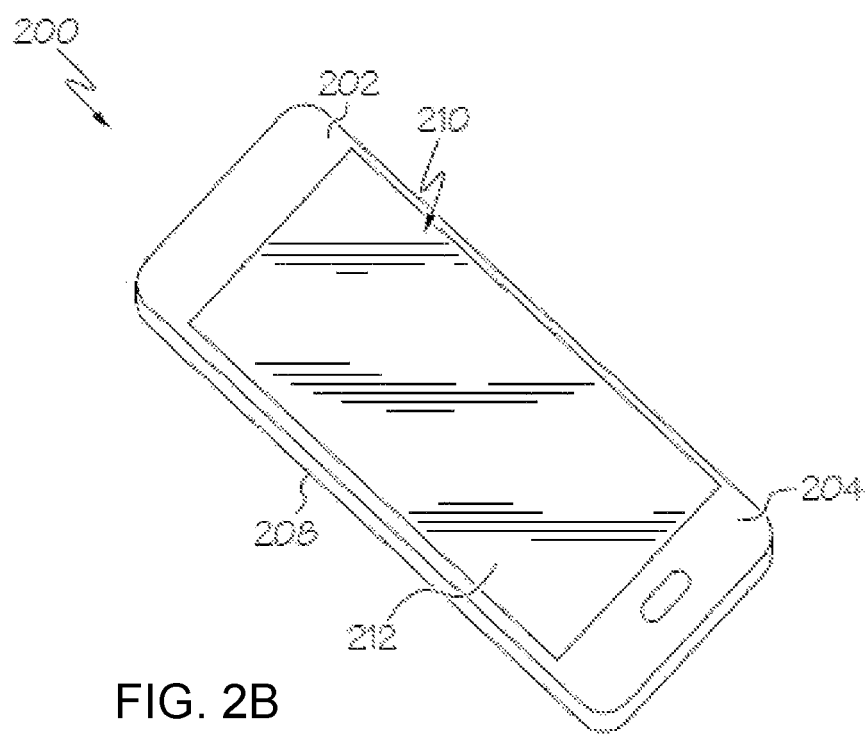
FIG. 2B is a perspective view of the exemplary electronic device of FIG. 2A.

The glass articles disclosed herein may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass articles disclosed herein is shown in FIGS. 2A and 2B. Specifically, FIGS. 2A and 2B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover 212 at or over the front surface of the housing such that it is over the display. In embodiments, at least a portion of at least one of the cover 212 and the housing 202 may include any of the glass articles described herein.

EXAMPLES

Embodiments will be further clarified by the following examples. It should be understood that these examples are not limiting to the embodiments described above.

Glass compositions were prepared and analyzed. The analyzed glass compositions had the components listed in Table I below, and were prepared by conventional glass forming methods. In Table I, all components are in mol %, and the $K_{IC}$ fracture toughness, the Poisson's ratio (v), the Young's modulus (E), the shear modulus (G), and the liquidus viscosity of the glass compositions were measured according to the methods disclosed in this specification.

TABLE I

| Composition | 1 | 2 | 3 | 4 |
|---|---|---|---|---|
| $SiO_2$ | 43.43 | 40.76 | 44.58 | 42.71 |
| $Al_2O_3$ | 27.72 | 28.10 | 26.15 | 26.05 |
| $B_2O_3$ | 13.36 | 13.50 | 13.55 | 13.57 |
| MgO | 2.02 | 4.06 | 2.06 | 4.00 |
| CaO | 0.04 | 0.06 | 0.04 | 0.06 |
| $Li_2O$ | 3.97 | 4.03 | 4.01 | 4.06 |
| $Na_2O$ | 8.97 | 9.01 | 9.11 | 9.06 |
| $K_2O$ | 0.42 | 0.43 | 0.44 | 0.44 |
| $SnO_2$ | 0.05 | 0.05 | 0.05 | 0.05 |
| $Fe_2O_3$ | 0.01 | 0.01 | 0.01 | 0.01 |
| $K_{IC}$ (MPa√m) | 0.831 | 0.845 | 0.820 | 0.821 |
| Young's modulus (GPa) | 80.3 | 81.3 | 77.8 | 79.0 |
| Shear modulus (GPa) | 32.1 | 32.5 | 31.3 | 31.6 |
| Poisson's ratio | 0.250 | 0.251 | 0.243 | 0.248 |
| Liquidus viscosity (Poise) | | | | |
| Composition | 5 | 6 | 7 | 8 |
| $SiO_2$ | 39.89 | 43.91 | 42.54 | 40.72 |
| $Al_2O_3$ | 25.90 | 15.30 | 27.98 | 28.05 |
| $B_2O_3$ | 12.99 | 12.71 | 13.69 | 13.40 |
| MgO | 8.03 | 15.10 | 2.03 | 4.04 |
| CaO | 0.08 | 0.11 | 0.04 | 0.05 |

TABLE I-continued

| | | | | |
|---|---|---|---|---|
| Li$_2$O | 3.91 | 3.90 | 9.24 | 9.28 |
| Na$_2$O | 8.76 | 8.56 | 3.97 | 3.95 |
| K$_2$O | 0.39 | 0.35 | 0.44 | 0.44 |
| SnO$_2$ | 0.05 | 0.05 | 0.05 | 0.05 |
| Fe$_2$O$_3$ | 0.01 | 0.01 | 0.01 | 0.01 |
| K$_{IC}$ (MPa√m) | 0.780 | 0.788 | 0.895 | 0.893 |
| Young's modulus (GPa) | 81.7 | 80.1 | 84.7 | 85.8 |
| Shear modulus (GPa) | 32.5 | 32.1 | 33.8 | 34.2 |
| Poisson's ratio | 0.256 | 0.247 | 0.252 | 0.254 |
| Liquidus viscosity (Poise) | | <634 | | <3572487 |

| Composition | 9 | 10 | 11 | 12 |
|---|---|---|---|---|
| SiO$_2$ | 44.62 | 42.62 | 38.72 | 42.03 |
| Al$_2$O$_3$ | 26.10 | 26.14 | 26.15 | 15.04 |
| B$_2$O$_3$ | 13.44 | 13.37 | 13.37 | 13.63 |
| MgO | 2.04 | 4.07 | 8.06 | 15.28 |
| CaO | 0.04 | 0.05 | 0.08 | 0.11 |
| Li$_2$O | 9.28 | 9.32 | 9.23 | 9.38 |
| Na$_2$O | 3.98 | 3.94 | 3.91 | 3.99 |
| K$_2$O | 0.44 | 0.43 | 0.42 | 0.46 |
| SnO$_2$ | 0.05 | 0.05 | 0.05 | 0.06 |
| Fe$_2$O$_3$ | 0.01 | 0.01 | 0.01 | 0.01 |
| K$_{IC}$ (MPa√m) | 0.874 | 0.875 | 0.897 | 0.876 |
| Young's modulus (GPa) | 82.3 | 83.6 | 86.0 | 87.8 |
| Shear modulus (GPa) | 33.0 | 33.3 | 34.3 | 35.0 |
| Poisson's ratio | 0.247 | 0.255 | 0.252 | 0.252 |
| Liquidus viscosity (Poise) | <9391 | | | |

| Composition | 13 |
|---|---|
| SiO$_2$ | 40.83 |
| Al$_2$O$_3$ | 29.76 |
| B$_2$O$_3$ | 13.59 |
| MgO | 2.05 |
| CaO | 0.04 |
| Li$_2$O | 9.19 |
| Na$_2$O | 4.03 |
| K$_2$O | 0.46 |
| SnO$_2$ | 0.05 |
| Fe$_2$O$_3$ | 0.01 |
| K$_{IC}$ (MPa√m) | |
| Young's modulus (GPa) | |
| Shear modulus (GPa) | |
| Poisson's ratio | |
| Liquidus viscosity (Poise) | |

Additional glass compositions were prepared including components in the amounts listed in Table II below. The additional glass compositions were prepared by conventional glass forming methods. In Table II, all components are in mol %, and the Young's modulus (E) and the hardness of the glass compositions were measured according to the methods disclosed in this specification.

TABLE II

| Composition | 14 | 15 | 16 | 17 | 18 | 19 | 20 | 21 |
|---|---|---|---|---|---|---|---|---|
| SiO$_2$ | 39.48 | 39.62 | 42.41 | 44.59 | 38.57 | 45.11 | 41.82 | 38.63 |
| Al$_2$O$_3$ | 31.19 | 30.85 | 26.18 | 26.14 | 25.56 | 25.47 | 25.04 | 24.91 |
| B$_2$O$_3$ | 13.50 | 13.50 | 9.79 | 13.50 | 13.50 | 13.50 | 12.00 | 13.50 |
| MgO | 2.34 | 2.53 | 8.12 | 2.27 | 8.87 | 2.42 | 7.65 | 9.47 |
| CaO | 0.00 | 0.00 | 0.00 | 0.00 | 0.00 | 0.00 | 0.00 | 0.00 |
| Li$_2$O | 9.00 | 4.00 | 9.00 | 9.00 | 9.00 | 4.00 | 9.00 | 4.00 |
| Na$_2$O | 4.00 | 9.00 | 4.00 | 4.00 | 4.00 | 9.00 | 4.00 | 9.00 |
| K$_2$O | 0.50 | 0.50 | 0.50 | 0.50 | 0.50 | 0.50 | 0.50 | 0.50 |
| Young's modulus (GPa) | 97.88 | 94.24 | 98.28 | 93.00 | 96.92 | 88.31 | 96.44 | 93.42 |
| Hardness (GPa) | 7.21 | 7.07 | 7.23 | 6.98 | 7.24 | 6.78 | 7.07 | 7.13 |

| Composition | 22 | 23 | 24 | 25 | 26 | 27 | 28 | 29 |
|---|---|---|---|---|---|---|---|---|
| SiO$_2$ | 44.21 | 54.00 | 41.22 | 43.63 | 45.95 | 40.61 | 43.05 | 45.39 |
| Al$_2$O$_3$ | 24.87 | 24.71 | 23.89 | 23.75 | 23.61 | 22.72 | 22.61 | 22.49 |
| B$_2$O$_3$ | 8.46 | 6.00 | 14.23 | 10.63 | 7.18 | 16.50 | 12.82 | 9.31 |
| MgO | 8.95 | 1.70 | 7.16 | 8.49 | 9.76 | 6.68 | 8.02 | 9.31 |
| CaO | 0.00 | 1.09 | 0.00 | 0.00 | 0.00 | 0.00 | 0.00 | 0.00 |
| Li$_2$O | 9.00 | 9.00 | 9.00 | 9.00 | 9.00 | 9.00 | 9.00 | 9.00 |
| Na$_2$O | 4.00 | 3.00 | 4.00 | 4.00 | 4.00 | 4.00 | 4.00 | 4.00 |
| K$_2$O | 0.50 | 0.50 | 0.50 | 0.50 | 0.50 | 0.50 | 0.50 | 0.50 |
| Young's modulus (GPa) | 99.15 | 93.69 | 94.73 | 95.34 | 96.81 | 93.75 | 94.38 | 94.93 |
| Hardness (GPa) | 7.39 | 7.30 | 7.01 | 7.12 | 7.29 | 6.97 | 7.00 | 7.15 |

| Composition | 30 | 31 | 32 | 33 | 34 | 35 | 36 | 37 |
|---|---|---|---|---|---|---|---|---|
| SiO$_2$ | 47.63 | 41.03 | 43.46 | 45.78 | 48.01 | 39.99 | 54.00 | 49.41 |
| Al$_2$O$_3$ | 22.39 | 21.90 | 21.81 | 21.71 | 21.62 | 21.54 | 21.41 | 21.39 |
| B$_2$O$_3$ | 5.94 | 16.76 | 13.09 | 9.59 | 6.23 | 18.79 | 6.00 | 13.50 |
| MgO | 10.54 | 6.81 | 8.14 | 9.42 | 10.65 | 6.18 | 1.71 | 2.20 |
| CaO | 0.00 | 0.00 | 0.00 | 0.00 | 0.00 | 0.00 | 4.38 | 0.00 |
| Li$_2$O | 9.00 | 9.00 | 9.00 | 9.00 | 9.00 | 9.00 | 9.00 | 9.00 |
| Na$_2$O | 4.00 | 4.00 | 4.00 | 4.00 | 4.00 | 4.00 | 3.00 | 4.00 |
| K$_2$O | 0.50 | 0.50 | 0.50 | 0.50 | 0.50 | 0.50 | 0.50 | 0.50 |
| Young's modulus (GPa) | 97.41 | 92.85 | 93.83 | 94.59 | 95.78 | 89.11 | 93.00 | 85.73 |
| Hardness (GPa) | 7.34 | 6.99 | 7.07 | 7.23 | 7.39 | 6.64 | 7.42 | 6.73 |

| Composition | 38 | 39 | 40 | 41 | 42 | 43 | 44 | 45 |
|---|---|---|---|---|---|---|---|---|
| SiO$_2$ | 49.27 | 43.45 | 42.88 | 45.22 | 50.13 | 47.47 | 37.75 | 39.37 |
| Al$_2$O$_3$ | 21.20 | 20.92 | 20.65 | 20.58 | 20.55 | 20.52 | 20.48 | 20.35 |
| B$_2$O$_3$ | 4.74 | 13.50 | 15.31 | 11.73 | 13.50 | 8.31 | 13.50 | 21.10 |
| MgO | 11.29 | 8.62 | 7.67 | 8.97 | 2.32 | 10.21 | 14.77 | 5.68 |
| CaO | 0.00 | 0.00 | 0.00 | 0.00 | 0.00 | 0.00 | 0.00 | 0.00 |
| Li$_2$O | 9.00 | 9.00 | 9.00 | 9.00 | 4.00 | 9.00 | 9.00 | 9.00 |
| Na$_2$O | 4.00 | 4.00 | 4.00 | 4.00 | 9.00 | 4.00 | 4.00 | 4.00 |
| K$_2$O | 0.50 | 0.50 | 0.50 | 0.50 | 0.50 | 0.50 | 0.50 | 0.50 |
| Young's modulus (GPa) | 97.00 | 92.02 | 91.90 | 93.69 | 83.89 | 95.12 | 98.78 | 87.70 |
| Hardness (GPa) | 7.42 | 7.04 | 6.97 | 7.14 | 6.62 | 7.26 | 7.36 | 6.61 |

| Composition | 46 | 47 | 48 | 49 | 50 | 51 | 52 | 53 |
|---|---|---|---|---|---|---|---|---|
| SiO$_2$ | 41.87 | 43.81 | 48.75 | 54.00 | 50.85 | 37.76 | 44.66 | 46.93 |
| Al$_2$O$_3$ | 20.28 | 20.11 | 20.11 | 20.07 | 20.05 | 19.69 | 19.44 | 19.40 |
| B$_2$O$_3$ | 17.28 | 13.50 | 6.79 | 6.00 | 3.58 | 13.50 | 13.90 | 10.41 |
| MgO | 7.06 | 9.08 | 10.86 | 6.40 | 12.02 | 15.56 | 8.51 | 9.76 |
| CaO | 0.00 | 0.00 | 0.00 | 1.03 | 0.00 | 0.00 | 0.00 | 0.00 |
| Li$_2$O | 9.00 | 4.00 | 9.00 | 9.00 | 9.00 | 4.00 | 9.00 | 9.00 |
| Na$_2$O | 4.00 | 9.00 | 4.00 | 3.00 | 4.00 | 9.00 | 4.00 | 4.00 |
| K$_2$O | 0.50 | 0.50 | 0.50 | 0.50 | 0.50 | 0.50 | 0.50 | 0.50 |
| Young's modulus (GPa) | 88.97 | 88.57 | 96.50 | 94.22 | 96.32 | 96.14 | 92.07 | 93.05 |
| Hardness (GPa) | 6.75 | 6.91 | 7.41 | 7.50 | 7.37 | 7.29 | 7.00 | 7.17 |

| Composition | 54 | 55 | 56 | 57 | 58 | 59 | 60 | 61 |
|---|---|---|---|---|---|---|---|---|
| SiO$_2$ | 38.74 | 41.27 | 43.69 | 48.22 | 50.35 | 52.39 | 57.50 | 57.50 |
| Al$_2$O$_3$ | 19.14 | 19.10 | 19.06 | 19.00 | 18.97 | 18.94 | 18.88 | 18.70 |
| B$_2$O$_3$ | 23.45 | 19.56 | 15.83 | 8.86 | 5.58 | 2.45 | 6.00 | 6.00 |

TABLE II-continued

| | | | | | | | | |
|---|---|---|---|---|---|---|---|---|
| MgO | 5.18 | 6.58 | 7.92 | 10.43 | 11.60 | 12.73 | 4.56 | 4.74 |
| CaO | 0.00 | 0.00 | 0.00 | 0.00 | 0.00 | 0.00 | 0.00 | 0.00 |
| $Li_2O$ | 9.00 | 9.00 | 9.00 | 9.00 | 9.00 | 9.00 | 10.56 | 10.56 |
| $Na_2O$ | 4.00 | 4.00 | 4.00 | 4.00 | 4.00 | 4.00 | 2.00 | 2.00 |
| $K_2O$ | 0.50 | 0.50 | 0.50 | 0.50 | 0.50 | 0.50 | 0.50 | 0.50 |
| Young's modulus (GPa) | 85.47 | 87.40 | 88.50 | 94.65 | 95.15 | 94.97 | 85.54 | 88.44 |
| Hardness (GPa) | 6.39 | 6.57 | 6.66 | 7.27 | 7.33 | 7.38 | 6.76 | 6.76 |

| Composition | 62 | 63 | 64 | 65 | 66 | 67 | 68 | 69 |
|---|---|---|---|---|---|---|---|---|
| $SiO_2$ | 57.50 | 57.50 | 57.50 | 57.50 | 57.50 | 57.50 | 57.50 | 57.50 |
| $Al_2O_3$ | 18.69 | 18.52 | 18.51 | 18.51 | 18.33 | 18.33 | 18.33 | 18.32 |
| $B_2O_3$ | 6.00 | 6.00 | 6.00 | 6.00 | 6.00 | 6.00 | 6.00 | 6.00 |
| MgO | 4.56 | 4.92 | 4.74 | 4.56 | 5.10 | 4.92 | 4.74 | 4.56 |
| CaO | 0.00 | 0.00 | 0.00 | 0.00 | 0.00 | 0.00 | 0.00 | 0.00 |
| $Li_2O$ | 10.75 | 10.56 | 10.75 | 10.93 | 10.56 | 10.75 | 10.94 | 11.12 |
| $Na_2O$ | 2.00 | 2.00 | 2.00 | 2.00 | 2.00 | 2.00 | 2.00 | 2.00 |
| $K_2O$ | 0.50 | 0.50 | 0.50 | 0.50 | 0.50 | 0.50 | 0.50 | 0.50 |
| Young's modulus (GPa) | 87.56 | 85.03 | 86.24 | 86.37 | 86.56 | 85.64 | 85.89 | 84.87 |
| Hardness (GPa) | 6.73 | 6.69 | 6.72 | 6.75 | 6.71 | 6.77 | 6.69 | 6.64 |

| Composition | 70 | 71 | 72 | 73 | 74 | 75 | 76 | 77 |
|---|---|---|---|---|---|---|---|---|
| $SiO_2$ | 46.39 | 57.50 | 57.50 | 57.50 | 57.50 | 57.50 | 57.50 | 54.00 |
| $Al_2O_3$ | 18.26 | 18.21 | 18.20 | 18.20 | 18.20 | 18.15 | 18.13 | 18.09 |
| $B_2O_3$ | 12.54 | 6.00 | 6.00 | 6.00 | 6.00 | 6.00 | 6.00 | 6.00 |
| MgO | 9.31 | 5.17 | 4.98 | 4.80 | 4.62 | 5.29 | 4.56 | 1.71 |
| CaO | 0.00 | 0.00 | 0.00 | 0.00 | 0.00 | 0.00 | 0.00 | 7.70 |
| $Li_2O$ | 9.00 | 10.63 | 10.81 | 11.00 | 11.18 | 10.56 | 11.31 | 9.00 |
| $Na_2O$ | 4.00 | 2.00 | 2.00 | 2.00 | 2.00 | 2.00 | 2.00 | 3.00 |
| $K_2O$ | 0.50 | 0.50 | 0.50 | 0.50 | 0.50 | 0.50 | 0.50 | 0.50 |
| Young's modulus (GPa) | 92.97 | 85.92 | 86.38 | 86.67 | 85.46 | 86.41 | 85.23 | 96.69 |
| Hardness (GPa) | 7.08 | 6.77 | 6.78 | 6.76 | 6.74 | 6.74 | 6.68 | 7.66 |

| Composition | 78 | 79 | 80 | 81 | 82 | 83 | 84 | 85 |
|---|---|---|---|---|---|---|---|---|
| $SiO_2$ | 57.50 | 57.50 | 57.50 | 57.50 | 57.50 | 57.50 | 57.50 | 38.10 |
| $Al_2O_3$ | 18.02 | 18.01 | 18.01 | 17.96 | 17.95 | 17.95 | 17.95 | 17.91 |
| $B_2O_3$ | 6.00 | 6.00 | 6.00 | 6.00 | 6.00 | 6.00 | 6.00 | 25.83 |
| MgO | 5.17 | 4.98 | 4.80 | 5.48 | 5.29 | 4.74 | 4.56 | 4.66 |
| CaO | 0.00 | 0.00 | 0.00 | 0.00 | 0.00 | 0.00 | 0.00 | 0.00 |
| $Li_2O$ | 10.82 | 11.00 | 11.19 | 10.56 | 10.75 | 11.31 | 11.50 | 9.00 |
| $Na_2O$ | 2.00 | 2.00 | 2.00 | 2.00 | 2.00 | 2.00 | 2.00 | 4.00 |
| $K_2O$ | 0.50 | 0.50 | 0.50 | 0.50 | 0.50 | 0.50 | 0.50 | 0.50 |
| Young's modulus (GPa) | 85.05 | 85.13 | 84.99 | 85.07 | 86.25 | 85.22 | 82.48 | 82.69 |
| Hardness (GPa) | 6.74 | 6.77 | 6.74 | 6.70 | 6.72 | 6.79 | 6.72 | 6.24 |

| Composition | 86 | 87 | 88 | 89 | 90 | 91 | 92 | 93 |
|---|---|---|---|---|---|---|---|---|
| $SiO_2$ | 40.66 | 43.11 | 45.45 | 47.69 | 49.84 | 51.90 | 53.88 | 57.50 |
| $Al_2O_3$ | 17.90 | 17.89 | 17.89 | 17.88 | 17.87 | 17.86 | 17.85 | 17.82 |
| $B_2O_3$ | 21.85 | 18.06 | 14.43 | 10.95 | 7.61 | 4.42 | 1.35 | 6.00 |
| MgO | 6.09 | 7.44 | 8.74 | 9.99 | 11.18 | 12.32 | 13.42 | 5.17 |
| CaO | 0.00 | 0.00 | 0.00 | 0.00 | 0.00 | 0.00 | 0.00 | 0.00 |
| $Li_2O$ | 9.00 | 9.00 | 9.00 | 9.00 | 9.00 | 9.00 | 9.00 | 11.01 |
| $Na_2O$ | 4.00 | 4.00 | 4.00 | 4.00 | 4.00 | 4.00 | 4.00 | 2.00 |
| $K_2O$ | 0.50 | 0.50 | 0.50 | 0.50 | 0.50 | 0.50 | 0.50 | 0.50 |
| Young's modulus (GPa) | 85.64 | 88.97 | 89.41 | 92.47 | 94.83 | 95.19 | 95.06 | 86.66 |
| Hardness (GPa) | 6.47 | 6.71 | 6.81 | 7.19 | 7.28 | 7.41 | 7.47 | 6.75 |

| Composition | 94 | 95 | 96 | 97 | 98 | 99 | 100 | 101 |
|---|---|---|---|---|---|---|---|---|
| $SiO_2$ | 57.50 | 57.50 | 57.50 | 57.50 | 57.50 | 57.50 | 57.50 | 57.50 |
| $Al_2O_3$ | 17.82 | 17.76 | 17.76 | 17.76 | 17.76 | 17.76 | 17.76 | 17.63 |
| $B_2O_3$ | 6.00 | 6.00 | 6.00 | 6.00 | 6.00 | 6.00 | 6.00 | 6.00 |
| MgO | 4.98 | 5.67 | 5.48 | 5.29 | 4.92 | 4.74 | 4.56 | 5.17 |
| CaO | 0.00 | 0.00 | 0.00 | 0.00 | 0.00 | 0.00 | 0.00 | 0.00 |
| $Li_2O$ | 11.19 | 10.56 | 10.76 | 10.95 | 11.32 | 11.50 | 11.69 | 11.20 |
| $Na_2O$ | 2.00 | 2.00 | 2.00 | 2.00 | 2.00 | 2.00 | 2.00 | 2.00 |
| $K_2O$ | 0.50 | 0.50 | 0.50 | 0.50 | 0.50 | 0.50 | 0.50 | 0.50 |
| Young's modulus (GPa) | 85.96 | 86.64 | 85.77 | 85.96 | 85.12 | 85.22 | 84.50 | 84.98 |
| Hardness (GPa) | 6.76 | 6.71 | 6.69 | 6.71 | 6.76 | 6.70 | 6.70 | 6.78 |

| Composition | 102 | 103 | 104 | 105 | 106 | 107 | 108 | 109 |
|---|---|---|---|---|---|---|---|---|
| $SiO_2$ | 57.50 | 57.50 | 57.50 | 57.50 | 57.50 | 57.50 | 57.50 | 57.50 |
| $Al_2O_3$ | 17.57 | 17.57 | 17.57 | 17.57 | 17.57 | 17.56 | 17.56 | 17.56 |
| $B_2O_3$ | 6.00 | 6.00 | 6.00 | 6.00 | 6.00 | 6.00 | 6.00 | 6.00 |
| MgO | 5.87 | 5.68 | 5.49 | 5.30 | 5.11 | 4.93 | 4.74 | 4.56 |
| CaO | 0.00 | 0.00 | 0.00 | 0.00 | 0.00 | 0.00 | 0.00 | 0.00 |
| $Li_2O$ | 10.57 | 10.76 | 10.95 | 11.14 | 11.33 | 11.51 | 11.69 | 11.88 |
| $Na_2O$ | 2.00 | 2.00 | 2.00 | 2.00 | 2.00 | 2.00 | 2.00 | 2.00 |
| $K_2O$ | 0.50 | 0.50 | 0.50 | 0.50 | 0.50 | 0.50 | 0.50 | 0.50 |
| Young's modulus (GPa) | 85.20 | 86.22 | 85.66 | 88.65 | 85.94 | 87.60 | 86.77 | 88.29 |
| Hardness (GPa) | 6.54 | 6.67 | 6.64 | 6.81 | 6.76 | 6.89 | 6.75 | 6.75 |

| Composition | 110 | 111 | 112 | 113 | 114 | 115 | 116 | 117 |
|---|---|---|---|---|---|---|---|---|
| $SiO_2$ | 54.00 | 53.96 | 48.07 | 42.43 | 54.75 | 54.00 | 37.01 | 48.58 |
| $Al_2O_3$ | 16.96 | 16.90 | 16.54 | 16.20 | 16.03 | 15.96 | 15.87 | 15.70 |
| $B_2O_3$ | 6.00 | 13.50 | 13.50 | 13.50 | 13.50 | 6.00 | 13.50 | 13.50 |
| MgO | 6.42 | 2.14 | 8.39 | 14.38 | 2.23 | 10.57 | 20.12 | 8.72 |
| CaO | 4.12 | 0.00 | 0.00 | 0.00 | 0.00 | 0.97 | 0.00 | 0.00 |
| $Li_2O$ | 9.00 | 9.00 | 9.00 | 9.00 | 4.00 | 9.00 | 9.00 | 4.00 |
| $Na_2O$ | 3.00 | 4.00 | 4.00 | 4.00 | 9.00 | 3.00 | 4.00 | 9.00 |
| $K_2O$ | 0.50 | 0.50 | 0.50 | 0.50 | 0.50 | 0.50 | 0.50 | 0.50 |
| Young's modulus (GPa) | 93.61 | 81.41 | 87.68 | 95.58 | 78.66 | 94.77 | 103.82 | 82.72 |
| Hardness (GPa) | 7.55 | 6.56 | 6.89 | 7.34 | 6.40 | 7.55 | 7.68 | 6.67 |

| Composition | 118 | 119 |
|---|---|---|
| $SiO_2$ | 42.67 | 36.98 |
| $Al_2O_3$ | 15.38 | 15.08 |
| $B_2O_3$ | 13.50 | 13.50 |
| MgO | 14.95 | 20.94 |
| CaO | 0.00 | 0.00 |
| $Li_2O$ | 4.00 | 4.00 |
| $Na_2O$ | 9.00 | 9.00 |
| $K_2O$ | 0.50 | 0.50 |
| Young's modulus (GPa) | 89.86 | 99.18 |
| Hardness (GPa) | 7.02 | 7.53 |

Substrates were formed from compositions of Table I, and subsequently ion exchanged to form example articles. The substrates had a thickness of 0.8 mm. The ion exchange included submerging the substrates into a molten salt bath for the times reported in Table III below. The salt bath included 90 wt % $KNO_3$ and 10 wt % $NaNO_3$, and was at a temperature of 460° C. The maximum compressive stress (CS), depth of layer of the spike ($DOL_{SP}$), and maximum central tension (CT) were measured according to the methods described herein and are reported in Table III.

TABLE III

| Example | A | B | C | D | E | F | G | H |
|---|---|---|---|---|---|---|---|---|
| Composition | 7 | 8 | 9 | 10 | 7 | 8 | 9 | 10 |
| Bath Temperature (° C.) | 460 | 460 | 460 | 460 | 460 | 460 | 460 | 460 |
| Time (hours) | 16 | 16 | 16 | 16 | 32 | 32 | 32 | 32 |
| Bath Composition (K/Na) | 90/10 | 90/10 | 90/10 | 90/10 | 90/10 | 90/10 | 90/10 | 90/10 |
| CS (MPa) | 597 | | 583 | | 553 | 580 | 526 | 561 |
| $DOL_{SP}$ (um) | 6.8 | | 7.6 | | 8.5 | 7.7 | 11 | 8.5 |
| CT (MPa) | | | | | | | | |

| Example | I | J | K | L | M | N | O | P |
|---|---|---|---|---|---|---|---|---|
| Composition | 7 | 7 | 7 | 7 | 8 | 8 | 8 | 8 |
| Bath Temperature (° C.) | 460 | 460 | 460 | 460 | 460 | 460 | 460 | 460 |
| Time (hours) | 4 | 8 | 32 | 16 | 4 | 8 | 16 | 32 |
| Bath Composition (K/Na) | 90/10 | 90/10 | 90/10 | 90/10 | 90/10 | 90/10 | 90/10 | 90/10 |
| CS (MPa) | | | 553 | 602 | | | | 581 |
| $DOL_{SP}$ (um) | | | | | | | | |
| CT (MPa) | 50.23 | 67.03 | 105.97 | 91.13 | 49.37 | 68.58 | 90.89 | 107.23 |

| Example | Q | R | S | T | U | V | W | X |
|---|---|---|---|---|---|---|---|---|
| Composition | 9 | 9 | 9 | 9 | 10 | 10 | 10 | 10 |
| Bath Temperature (° C.) | 460 | 460 | 460 | 460 | 460 | 460 | 460 | 460 |
| Time (hours) | 4 | 8 | 32 | 16 | 4 | 8 | 16 | 32 |
| Bath Composition (K/Na) | 90/10 | 90/10 | 90/10 | 90/10 | 90/10 | 90/10 | 90/10 | 90/10 |
| CS (MPa) | | | 524 | 577 | | | | 560 |
| $DOL_{SP}$ (um) | | | | | | | | |
| CT (MPa) | 58.24 | 74.4 | 97.21 | 93.85 | 49.84 | 68.12 | 87.67 | 104.93 |

| Example | Y | Z | AA | BB | CC | DD | EE | FF |
|---|---|---|---|---|---|---|---|---|
| Composition | 11 | 11 | 11 | 11 | 12 | 12 | 12 | 12 |
| Bath Temperature (° C.) | 460 | 460 | 460 | 460 | 460 | 460 | 460 | 460 |
| Time (hours) | 4 | 8 | 16 | 32 | 4 | 8 | 16 | 32 |
| Bath Composition (K/Na) | 90/10 | 90/10 | 90/10 | 90/10 | 90/10 | 90/10 | 90/10 | 90/10 |
| CS (MPa) | | | | | | | | |
| $DOL_{SP}$ (um) | | | | | | | | |
| CT (MPa) | 41.25 | 56.25 | 80.54 | 105.41 | 24.81 | 30.09 | 42.06 | 45.58 |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A composition, comprising:
    greater than or equal to 37.0 mol % to less than or equal to 57.5 mol % $SiO_2$;
    greater than or equal to 15.0 mol % to less than or equal to 31.2 mol % $Al_2O_3$;
    greater than or equal to 1.3 mol % to less than or equal to 25.9 mol % $B_2O_3$;
    greater than or equal to 0 mol % to less than or equal to 7.7 mol % CaO;
    greater than or equal to 0.35 mol % to less than or equal to 0.5 mol % $K_2O$;
    greater than or equal to 1.7 mol % to less than or equal to 21.0 mol % MgO;
    greater than or equal to 2.0 mol % to less than or equal to 9.0 mol % $Na_2O$; and
    greater than or equal to 4.0 mol % to less than or equal to 11.9 mol % $Li_2O$.

2. The composition of claim 1, wherein the composition has a liquidus viscosity of less than 1000 Poise.

3. The composition of claim 1, wherein the composition has a fracture toughness of greater than or equal 0.75 MPa√m.

4. The composition of claim 1, wherein the composition has a Young's modulus of greater than or equal to 80 GPa to less than or equal to 120 GPa.

5. The composition of claim 1, wherein the composition has a hardness of greater than or equal to 6.2 GPa to less than or equal to 7.7 GPa.

6. A composition, comprising:
    $Si_2O$;
    greater than 15 mol % to less than or equal to 32 mol % $Al_2O_3$;
    $B_2O_3$;
    $K_2O$;
    MgO;
    $Na_2O$; and
    $Li_2O$;
    wherein the composition has a fracture toughness of greater than or equal 0.75 MPa√m, and a Young's modulus of greater than or equal to 80 GPa to less than or equal to 120 GPa.

7. The composition of claim 6, further comprising CaO.

8. The composition of claim 6, comprising greater than or equal to 37.0 mol % to less than or equal to 57.5 mol % $SiO_2$.

9. The composition of claim 6, comprising greater than or equal to 1.3 mol % to less than or equal to 25.9 mol % $B_2O_3$.

10. The composition of claim 6, comprising greater than or equal to 0 mol % to less than or equal to 7.7 mol % CaO.

11. The composition of claim 6, comprising greater than or equal to 0.35 mol % to less than or equal to 0.5 mol % $K_2O$.

12. The composition of claim 6, comprising greater than or equal to 1.7 mol % to less than or equal to 21.0 mol % MgO.

13. The composition of claim 6, comprising greater than or equal to 2.0 mol % to less than or equal to 9.0 mol % $Na_2O$.

14. The composition of claim 6, comprising greater than or equal to 4.0 mol % to less than or equal to 11.9 mol % $Li_2O$.

15. The composition of claim 6, wherein the composition has a liquidus viscosity of less than 1000 Poise.

16. A glass-based article formed by ion exchanging a glass-based substrate, comprising:
    a compressive stress region extending from a surface of the glass-based article to a depth of compression,
    wherein the glass-based substrate comprises the composition of claim 6.

17. A glass-based article, comprising:
    a compressive stress region extending from a surface of the glass-based article to a depth of compression;
    a composition at the center of the glass-based article comprising:
        greater than or equal to 37.0 mol % to less than or equal to 57.5 mol % $SiO_2$;
        greater than or equal to 15.0 mol % to less than or equal to 31.2 mol % $Al_2O_3$;
        greater than or equal to 1.3 mol % to less than or equal to 25.9 mol % $B_2O_3$;
        greater than or equal to 0 mol % to less than or equal to 7.7 mol % CaO;
        greater than or equal to 0.35 mol % to less than or equal to 0.5 mol % $K_2O$;
        greater than or equal to 1.7 mol % to less than or equal to 21.0 mol % MgO;
        greater than or equal to 2.0 mol % to less than or equal to 9.0 mol % $Na_2O$; and
        greater than or equal to 4.0 mol % to less than or equal to 11.9 mol % $Li_2O$.

18. The glass-based article of claim 17, wherein the compressive stress region comprises a compressive stress of greater than or equal to 500 MPa.

19. The glass-based article of claim 17, comprising a depth of spike $DOL_{sp}$ of greater than or equal to 5 μm.

20. A consumer electronic product, comprising:
    a housing comprising a front surface, a back surface and side surfaces;
    electrical components at least partially within the housing, the electrical components comprising a controller, a memory, and a display, the display at or adjacent the front surface of the housing; and
    a cover disposed over the display,
    wherein at least a portion of at least one of the housing or the cover comprises the glass-based article of claim 17.

21. A method, comprising:
    ion exchanging a glass-based substrate to form a glass-based article comprising a compressive stress region extending from a surface of the glass-based article to a depth of compression;
    wherein the glass-based substrate comprises the composition of claim 1.

22. A method, comprising:
    ion exchanging a glass-based substrate to form a glass-based article comprising a compressive stress region extending from a surface of the glass-based article to a depth of compression;
    wherein the glass-based substrate comprises the composition of claim 6.

* * * * *

UNITED STATES PATENT AND TRADEMARK OFFICE
CERTIFICATE OF CORRECTION

| | | |
|---|---|---|
| PATENT NO. | : 11,680,008 B2 | |
| APPLICATION NO. | : 17/100172 | |
| DATED | : June 20, 2023 | |
| INVENTOR(S) | : Xiaoju Guo et al. | |

It is certified that error appears in the above-identified patent and that said Letters Patent is hereby corrected as shown below:

On the Title Page

On the Page 2, in Column 1, under "Other Publications", Line 4, delete "Al2O3" and insert -- $Al_2O_3$ --.

Signed and Sealed this
Ninth Day of April, 2024

Katherine Kelly Vidal
*Director of the United States Patent and Trademark Office*